US012762847B2

(12) United States Patent
Sato et al.

(10) Patent No.: US 12,762,847 B2
(45) Date of Patent: Oct. 13, 2026

(54) DATA CREATION SYSTEM, DATA CREATION METHOD, AND PROGRAM

(71) Applicant: Panasonic Intellectual Property Management Co., Ltd., Osaka (JP)

(72) Inventors: Taichi Sato, Kyoto (JP); Satoshi Hirotsune, Hyogo (JP); Ryosuke Goto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 189 days.

(21) Appl. No.: 18/846,579

(22) PCT Filed: Mar. 23, 2023

(86) PCT No.: PCT/JP2023/011539
§ 371 (c)(1),
(2) Date: Sep. 12, 2024

(87) PCT Pub. No.: WO2023/190046
PCT Pub. Date: Oct. 5, 2023

(65) Prior Publication Data

US 2025/0191346 A1 Jun. 12, 2025

(30) Foreign Application Priority Data

Mar. 29, 2022 (JP) ................................ 2022-054530

(51) Int. Cl.
*G06V 10/774* (2022.01)
*G06V 10/26* (2022.01)
(Continued)

(52) U.S. Cl.
CPC ........... *G06V 10/774* (2022.01); *G06V 10/26* (2022.01); *G06V 10/759* (2022.01);
(Continued)

(58) Field of Classification Search
None
See application file for complete search history.

(56) References Cited

U.S. PATENT DOCUMENTS 6,597,805 B1 * 7/2003 Nagao .................. G06T 7/0004 382/172
2007/0009148 A1 * 1/2007 Brasen ............ G01N 21/95607 382/149
(Continued)

FOREIGN PATENT DOCUMENTS

JP 2005-156334 A 6/2005
JP 2006-003603 A 1/2006
(Continued)

OTHER PUBLICATIONS

International Search Report dated Jun. 6, 2023 issued in International Patent Application No. PCT/JP2023/011539, with English translation.
(Continued)

*Primary Examiner* — Haris Sabah
(74) *Attorney, Agent, or Firm* — Rimon P.C.

(57) ABSTRACT

A data creation system includes a first image acquirer, a second image acquirer, a segmenter, a range generator, and a creator. The first image acquirer acquires a first image representing a first object including a particular part. The second image acquirer acquires a second image representing a second object. The segmenter divides at least one of the first image or the second image into a plurality of regions. The range generator generates, based on a result of segmentation obtained by the segmenter, a single or plurality of range patterns. The creator superposes, in accordance with at least one range pattern belonging to the single or plurality of range patterns, the particular part on the second image to
(Continued)

create a single or plurality of superposed images and output the single or plurality of superposed images as learning data.

17 Claims, 8 Drawing Sheets

(51) Int. Cl.

| | |
|---|---|
| ***G06V 10/74*** | (2022.01) |
| ***G06V 10/75*** | (2022.01) |
| ***G06V 10/94*** | (2022.01) |
| *G06V 10/82* | (2022.01) |
| *H04N 1/387* | (2006.01) |

(52) U.S. Cl.

CPC .......... *G06V 10/761* (2022.01); *G06V 10/945* (2022.01); *G06V 10/82* (2022.01); *H04N 1/3871* (2013.01)

(56) References Cited

U.S. PATENT DOCUMENTS

| | | | | |
|---|---|---|---|---|
| 2010/0166319 | A1 | 7/2010 | Zhang | |
| 2020/0175672 | A1* | 6/2020 | Tanaka | G06T 7/0004 |
| 2021/0150790 | A1 | 5/2021 | Itagaki et al. | |
| 2022/0375188 | A1* | 11/2022 | Deng | G06V 10/764 |
| 2022/0406049 | A1* | 12/2022 | El-Baz | G16H 30/20 |
| 2024/0104904 | A1 | 3/2024 | Du et al. | |

FOREIGN PATENT DOCUMENTS

| | | | |
|---|---|---|---|
| JP | 2019-109563 | A | 7/2019 |
| JP | 2020-060883 | A | 4/2020 |
| WO | 2019/117065 | A1 | 6/2019 |
| WO | 2021/193347 | A1 | 9/2019 |

OTHER PUBLICATIONS

International Search Report dated Jun. 13, 2023 issued in International Patent Application No. PCT/JP2023/011537, with English translation.

International Search Report dated Jun. 6, 2023 issued in International Patent Application No. PCT/JP2023/011538, with English translation.

Non-Final Office Action received in related U.S. Appl. No. 18/846,575, dated Mar. 11, 2026.

Office Action issued in related U.S. Appl. No. 18/846,583, dated Jun. 5, 2026.

* cited by examiner

DATA CREATION SYSTEM, DATA CREATION METHOD, AND PROGRAM

CROSS-REFERENCE OF RELATED APPLICATIONS

This application is the U.S. National Phase under 35 U.S.C. § 371 of International Patent Application No. PCT/JP2023/011539, filed on Mar. 23, 2023, which in turn claims the benefit of Japanese Patent Application No. 2022-054530, filed on Mar. 29, 2022, the entire disclosures of which Applications are incorporated by reference herein.

TECHNICAL FIELD

The present disclosure generally relates to a data creation system, a data creation method, and a program. More particularly, the present disclosure relates to a data creation system, a data creation method, and a program, all of which are used to create data for machine learning purposes.

BACKGROUND ART

Patent Literature 1 discloses a data generator for generating learning data. The data generator includes: an acquisition unit for acquiring an image of an inspection target: an input unit for accepting designation of a partial image including a detection target part: and a correction unit for correcting the partial image based on a feature quantity of the detection target part. In addition, the data generator further includes a generation unit for generating a synthetic image by synthesizing together the corrected partial image and another image different from an image including the partial image, thereby generating new learning data to make an identifier do learning.

Furthermore, this data generator generates a synthetic image by synthesizing a partial image with a particular spot of the inspection target which is highly likely to cause a defect from a statistical point of view. The data generator also searches an original image and the synthesized image for a pair of spots having similar background patterns around the defect.

The data generator of Patent Literature 1 locates a spot where a defect (imperfection) is highly likely to be produced from a statistical point of view. Thus, if the amount of defective data is small, then the accuracy of decision made by such a data generator decreases. In addition, if there is a low degree of similarity between the original image and the synthesized image, then the data generator may fail to locate the synthesized spot, thus possibly causing a decline in the accuracy of the learning data.

CITATION LIST

Patent Literature

Patent Literature 1: JP 2019-109563 A

SUMMARY OF INVENTION

In view of the foregoing background, it is therefore an object of the present disclosure to provide a data creation system, a data creation method, and a program, all of which contribute to improving the accuracy of learning data.

A data creation system according to an aspect of the present disclosure is configured to create learning data for generating a learned model for use to recognize a particular part. The data creation system includes a first image acquirer, a second image acquirer, a segmenter, a range generator, and a creator. The first image acquirer acquires a first image representing a first object including the particular part. The second image acquirer acquires a second image representing a second object. The segmenter divides at least one of the first image or the second image into a plurality of regions. The range generator generates, based on a result of segmentation obtained by the segmenter, a single or plurality of range patterns. The creator superposes, in accordance with at least one range pattern belonging to the single or plurality of range patterns, the particular part on the second image to create a single or plurality of superposed images and output the single or plurality of superposed images as the learning data.

A data creation system according to another aspect of the present disclosure is configured to create learning data for generating a learned model for use to recognize a particular part. The data creation system includes a part information acquirer, an image acquirer, a segmenter, a range generator, and a creator. The part information acquirer acquires information about the particular part. The image acquirer acquires an object image representing an object. The segmenter divides the object image into a plurality of regions. The range generator generates, based on a result of segmentation obtained by the segmenter, a single or plurality of range patterns for the object image. The creator superposes, in accordance with at least one range pattern belonging to the single or plurality of range patterns, the particular part on the object image to create a single or plurality of superposed images and output the single or plurality of superposed images as the learning data.

A data creation method according to still another aspect of the present disclosure is designed to create learning data for generating a learned model for use to recognize a particular part. The data creation method includes first image acquisition processing, second image acquisition processing, segmentation processing, range generation processing, and creation processing. The first image acquisition processing includes acquiring a first image representing a first object including the particular part. The second image acquisition processing includes acquiring a second image representing a second object. The segmentation processing includes dividing at least one of the first image or the second image into a plurality of regions. The range generation processing includes generating, based on a result of segmentation obtained in the segmentation processing, a single or plurality of range patterns. The creation processing includes superposing, in accordance with at least one range pattern belonging to the single or plurality of range patterns, the particular part on the second image to create a single or plurality of superposed images and output the single or plurality of superposed images as the learning data.

A data creation method according to yet another aspect of the present disclosure is designed to create learning data for generating a learned model for use to recognize a particular part. The data creation method includes part information acquisition processing, image acquisition processing, segmentation processing, range generation processing, and creation processing. The part information acquisition processing includes acquiring information about the particular part. The image acquisition processing includes acquiring an object image representing an object. The segmentation processing includes dividing the object image into a plurality of regions. The range generation processing includes generating, based on a result of segmentation obtained in the segmentation processing, a single or plurality of range patterns for the object image. The creation processing includes superposing, in accordance with at least one range pattern belonging to the single or plurality of range patterns, the particular part on the object image to create a single or plurality of superposed images and output the single or plurality of superposed images as the learning data.

A program according to yet another aspect of the present disclosure is designed to cause one or more processors to perform one of the two data creation methods described above.

DESCRIPTION OF EMBODIMENTS

Embodiment

A data creation system 5 according to an exemplary embodiment will now be described with reference to the accompanying drawings. Note that the exemplary embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. The drawings to be referred to in the following description of embodiments are all schematic representations. Thus, the ratio of the dimensions (including thicknesses) of respective constituent elements illustrated on the drawings does not always reflect their actual dimensional ratio.

Overview

Figure 1:
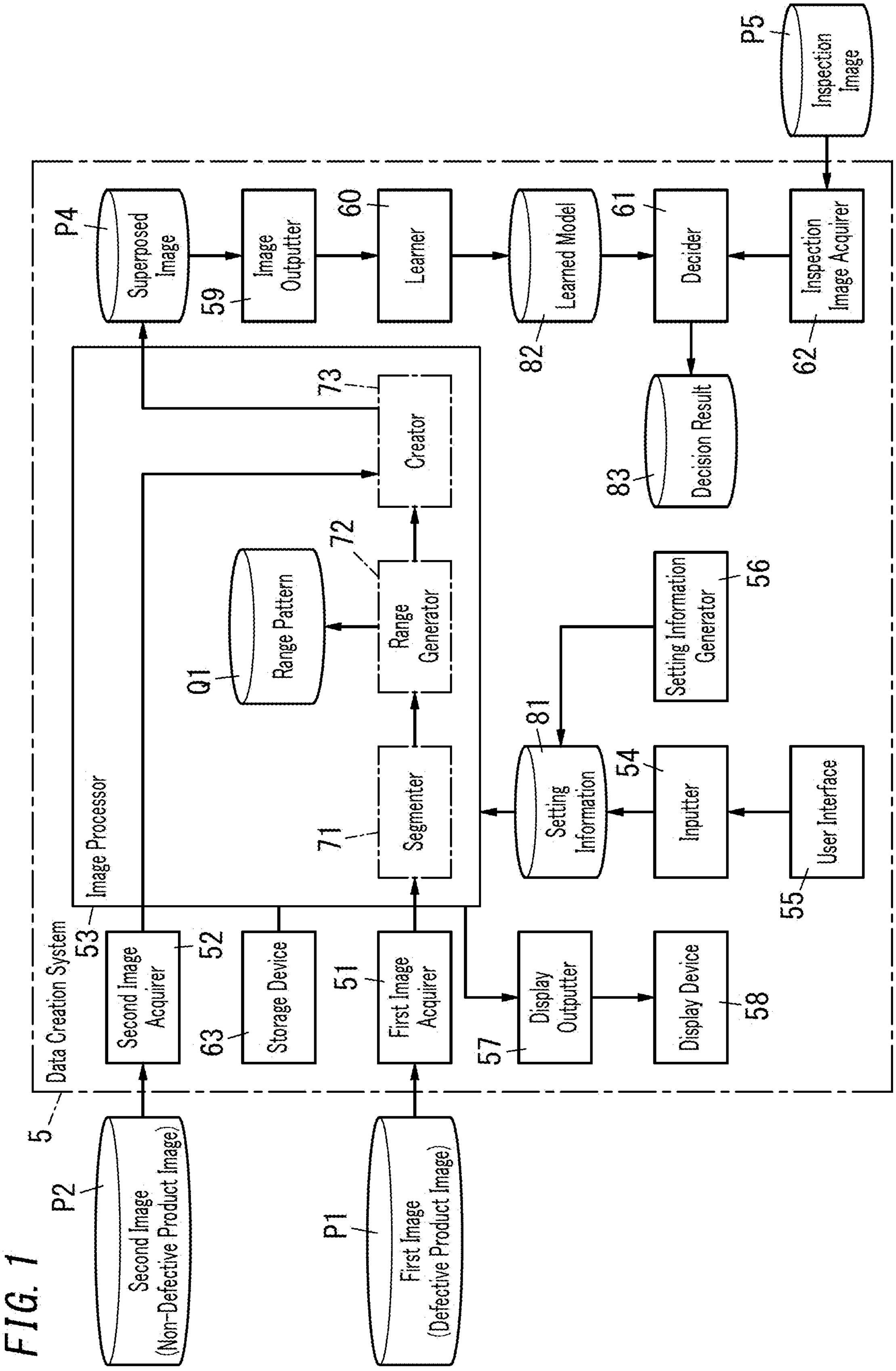
FIG. 1 illustrates an overall configuration for a data creation system according to an exemplary embodiment.
Figure 3:
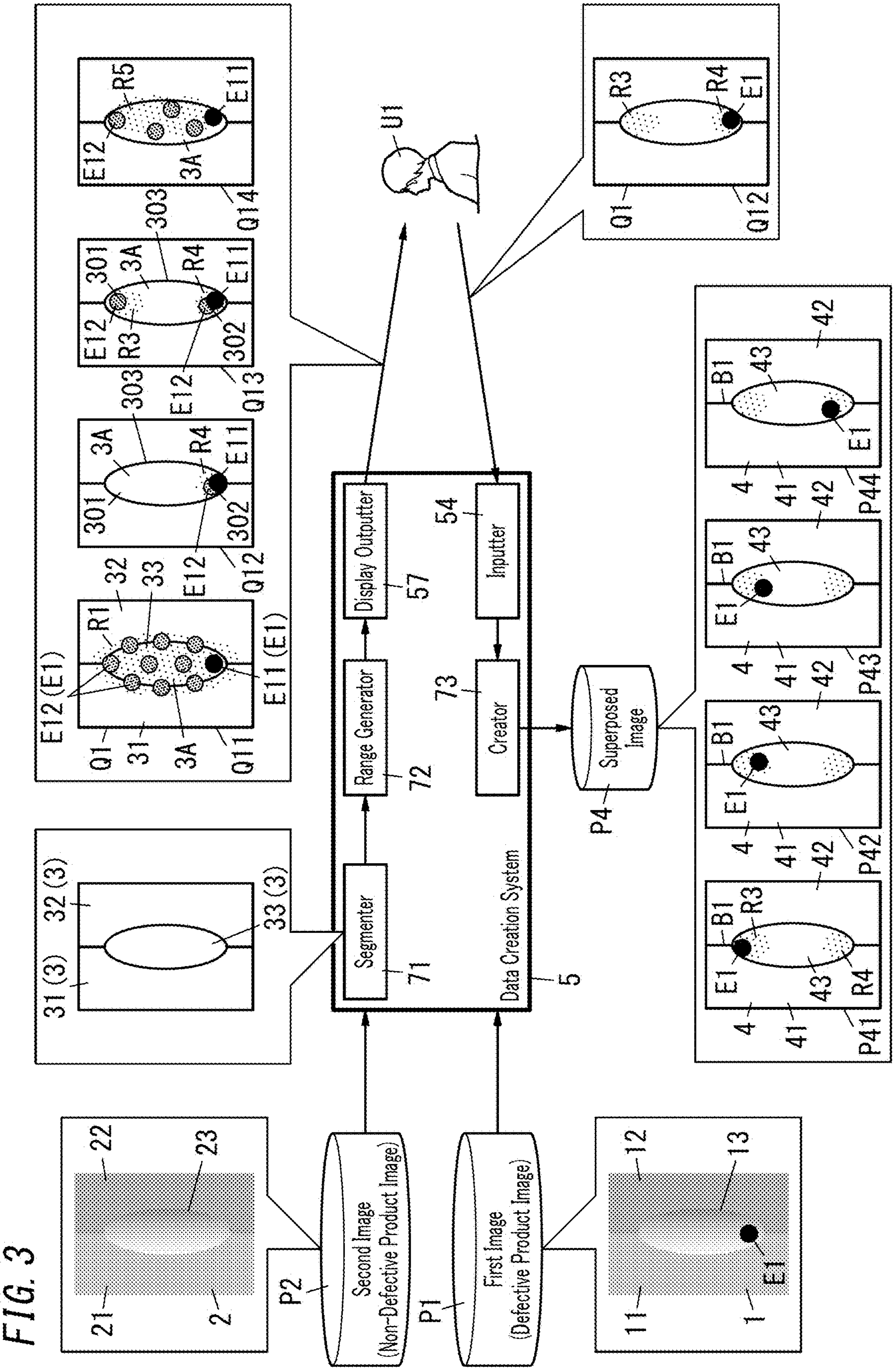
FIG. 3 is a conceptual diagram illustrating a plurality of images generated along the flow of a series of operations performed by the data creation system.

A data creation system 5 (refer to FIG. 1) according to an exemplary embodiment is configured to create learning data for generating a learned model 82 (refer to FIG. 1) for use to recognize a particular part E1 (refer to FIG. 3). In this embodiment, the data creation system 5 creates a superposed image P4 based on a first image P1 and a second image P2 as shown in FIG. 1, for example. The superposed image P4 is learning data for use to generate a model by machine learning.

As used herein, the "model" refers to a program designed to recognize, in response to entry of input information about an object to be recognized (object), the condition of the object to be recognized and output a result of recognition. Also, as used herein, the "learned model" refers to a model about which machine learning using learning data is completed. Furthermore, the "learning data (set)" as used herein refers to a data set including, in combination, input information (image) to be entered for a model and a label attached to the input information, i.e., so-called "training data." That is to say, the learned model 82 as used herein refers to a model about which machine learning has been done by supervised learning.

The "learned model 82" as used herein may include, for example, either a model that uses a neural network or a model generated by deep learning using a multilayer neural network. Examples of the neural networks may include a convolutional neural network (CNN) and a Bayesian neural network (BNN). The learned model 82 may be implemented by, for example, installing a learned neural network into an integrated circuit such as an application specific integrated circuit (ASIC) or a field-programmable gate array (FPGA). However, the learned model 82 does not have to be a model generated by deep learning. Alternatively, the learned model 82 may also be a model generated by a support vector machine or a decision tree, for example.

In this embodiment, the object to be recognized may be, for example, a welded product. FIG. 3 shows an exemplary superposed image P4 (learning data) in which an object 4 is shot. The object 4, as well as the object to be recognized, is a welded product. The object 4 includes a first base metal 41, a second base metal 42, and a bead 43 as shown in FIG. 3.

The bead 43 is formed, when two or more welding base materials (e.g., the first base metal 41 and the second base metal 42 in this example) are welded together via a metallic welding material, in a boundary B1 (refer to FIG. 3: welding spot) between the first base metal 41 and the second base metal 42. The dimensions and shape of the bead 43 depend mainly on the welding material. The object 4 further includes a defective part as a particular part E1. In the following description, a spot with the particular part E1 (defective part) will be hereinafter referred to as a "defect produced spot."

Thus, when an image representing the object to be recognized (hereinafter simply referred to as an "object") is entered as an inspection image P5 (refer to FIG. 1), the learned model 82 recognizes the condition of the object and outputs a result of recognition. The learned model 82 recognizes the particular part E1 by, for example, determining whether there is any particular part E1 (defective part) and/or detecting the type of the particular part E1 if any.

In this embodiment, the learned model 82 outputs, as the result of recognition, information indicating whether the object is a defective product or a non-defective (i.e., good) product and information about the type of the defective part if the object is a defective product. That is to say, the learned model 82 is used to determine whether the object is a good product or not. In other words, the learned model 82 is used to conduct a weld appearance test to determine whether welding has been done properly.

Decision about whether the object is good or defective may be made by, for example, determining whether there is any of various particular parts E1 (defective parts) such as the ones shown in FIGS. 2A-2E. FIGS. 2A-2E illustrate various conditions of a first object 1 (to be described later). The first object 1 includes a first base metal 11, a second base metal 12, a bead 13, and the particular part E1 (defective part). As various exemplary particular parts E1 (defective parts), FIGS. 2A, 2B, 2C, 2D, and 2E schematically illustrates a pit C1 of the bead 13, a sputter C2 of the bead 13, a projection C3 of the bead 13, a burn-through (hole) C4 of the bead 13, and an undercut C5 of the first object 1, respectively. For example, if at least one of the defective parts enumerated above has been formed, then the object is determined to be a defective product. Alternatively, decision about whether the object is good or defective may also be made depending on, for example, whether the length of the bead, the height of the bead, the angle of elevation of the bead, the throat depth of the bead, the excess metal of the bead, and the misalignment of the welding spot of the bead (including the degree of shift of the beginning of the bead) fall within their respective tolerance ranges. For example, if at least one of the parameters enumerated above fails to fall within its tolerance range, then the object is determined to be a defective product.

To make machine learning about a model, a great many image data items about the objects to be recognized, including defective products, need to be collected as learning data. However, if the objects to be recognized turn out to be defective at a low frequency of occurrence on a production line of the objects, then learning data required to generate a learned model 82 with high recognizability tends to be short. Thus, to overcome this problem, machine learning about a model may be made with the number of learning data items increased by performing data augmentation processing about learning data (i.e., the first image P1 and the second image P2) acquired by actually shooting the object. As used herein, the "data augmentation processing" refers to the processing of increasing the number of learning data items by subjecting the learning data to various types of processing such as synthesis, translation, scaling up or down (expansion or contraction), rotation, flipping, and addition of noise, for example. According to this embodiment, a single or plurality of superposed images P4 (which is supposed to be a great many superposed images P4 by the present inventors) is generated by performing the data augmentation processing and used as the learning data. In addition, according to this embodiment, the superposed images P4 are also generated by performing, on a plurality of original images (i.e., a plurality of learning data items) that have not been subjected to image processing yet by the data creation system 5, the processing of superposing (i.e., synthesizing) these original images together.

Note that the plurality of original images (i.e., the first image P1 and the second image P2) for use to generate the superposed image P4 do not have to be used as learning data for generating the learned model 82. That is to say, the learning data for use to generate the learned model 82 may either consist of only the at least one superposed image P4 or include the images not generated by the data creation system 5 (e.g., the first image P1 and the second image P2), in addition to the at least one superposed image P4. That is to say, the learning data for use to generate the learned model 82 may or may not include the original images that have not been subjected to the image processing yet by the data creation system 5. Also, the learning data for use to generate the learned model 82 may include images generated by a system other than the data creation system 5.

As shown in FIG. 1, the data creation system 5 according to this embodiment includes a first image acquirer 51, a second image acquirer 52, a segmenter 71, a range generator 72, and a creator 73.

The first image acquirer 51 acquires a first image P1 (e.g., a defective product image) representing a first object 1 including the particular part E1 (such as a defective part). In this embodiment, the first image P1 is supposed to be a captured image generated by actually shooting the first object 1 with an image capture device (image capturing system). However, this is only an example and should not be construed as limiting. Alternatively, the first image P1 may also be a transformed image created by subjecting the captured image to image transformation processing (such as synthesis, translation, scaling up and down, rotation, flipping, or addition of noise) or even a computer graphics (CG) image.

The second image acquirer 52 acquires a second image P2 (e.g., a non-defective product image) representing a second object 2. In this embodiment, the second image P2 is supposed to be a captured image generated by actually shooting the second object 2 with an image capture device (image capturing system). However, this is only an example and should not be construed as limiting. Alternatively, the second image P2 may also be a transformed image created by subjecting the captured image to image transformation processing (such as synthesis, translation, scaling up and down, rotation, flipping, or addition of noise) or even a CG image.

The segmenter 71 divides at least one of the first image P1 or the second image P2 into a plurality of regions (i.e., segments). In this embodiment, the segmenter 71 may divide the first image P1 into a plurality of regions 3 (refer to FIG. 3), for example. Specifically, in this embodiment, the segmenter 71 extracts a pixel region representing the particular part E1 and locates pixel regions representing the first base metal 11, the second base metal 12, and the bead 13, respectively, in the pixel region other than the pixel region representing the particular part E1, thereby dividing the first image P1 into three regions 3.

The range generator 72 generates, based on the result of segmentation obtained by the segmenter 71, a single or plurality of range patterns Q1 (i.e., a single or plurality of candidate range data items). For example, the range generator 72 may predict (or generate) the single or plurality of range patterns Q1 based on the three regions 3 representing the first base metal 11, the second base metal 12, and the bead 13, respectively, and the spot where the particular part E1 has been formed (i.e., the defect produced spot).

The creator 73 superposes, in accordance with at least one range pattern Q1 belonging to the single or plurality of range patterns Q1, the particular part E1 on the second image P2 to create a single or plurality of superposed images P4 and output the single or plurality of superposed images P4 as the learning data. In this embodiment, the data creation system 5 is supposed to make the display device 58 (refer to FIG. 1) display a single or plurality of range patterns Q1 to prompt the user U1 (refer to FIG. 3) to choose at least one range pattern Q1 from the single or plurality of range patterns Q1. However, this is only an example and should not be construed as limiting. Alternatively, the creator 73 may automatically select at least one range pattern Q1 from the single or plurality of range patterns Q1.

This embodiment enables creating an image (superposed image P4) suitable for machine learning. In particular, the particular part E1 is superposed on the second image P2 in accordance with the range pattern Q1. Thus, according to this embodiment, a spot where the particular part E1 is likely to be present (i.e., a spot where a defect is likely to be produced) is not located from a statistical point of view unlike the data generator of Patent Literature 1, for example. This reduces the chances of causing a decline in the accuracy of the learning data due to the shortage of images covering the particular part E1 (i.e., defective product images). In addition, according to this embodiment, the synthesized spot is not located based on the degree of similarity between the original image and the synthesized image unlike the data generator of Patent Literature 1, thus reducing the chances of causing a decline in the accuracy of learning data. Consequently, the data creation system 5 according to this embodiment achieves the advantage of contributing to improving the accuracy of learning data.

The functions of the data creation system 5 may also be implemented as a data creation method. A data creation method according to this embodiment is designed to create learning data for generating a learned model 82 for use to recognize a particular part E1. The data creation method includes first image acquisition processing, second image acquisition processing, segmentation processing, range generation processing, and creation processing. The first image acquisition processing includes acquiring a first image P1 representing a first object 1 including the particular part E1. The second image acquisition processing includes acquiring a second image P2 representing a second object 2. The segmentation processing includes dividing at least one of the first image P1 or the second image P2 into a plurality of regions. The range generation processing includes generating, based on a result of segmentation obtained in the segmentation processing, a single or plurality of range patterns Q1. The creation processing includes superposing, in accordance with at least one range pattern Q1 belonging to the single or plurality of range patterns Q1, the particular part E1 on the second image P2 to create a single or plurality of superposed images P4 and output the single or plurality of superposed images P4 as the learning data.

Also, the data creation method is used on a computer system (data creation system 5). That is to say, the data creation method may also be implemented as a program. A program according to this embodiment is designed to cause one or more processors (of a computer system) to perform the data creation method according to this embodiment. The program may be stored on a non-transitory storage medium readable for the computer system.

Details

Next, a data creation system 5 according to this embodiment will be described in further detail.

(1) Overall Configuration

The data creation system 5 shown in FIG. 1 includes a computer system including one or more processors and a memory. At least some functions of the data creation system 5 are performed by making the processor of the computer system execute a program stored in the memory of the computer system. The program may be stored in the memory. Alternatively, the program may also be downloaded via a telecommunications line such as the Internet or distributed after having been stored in a non-transitory storage medium such as a memory card.

The data creation system 5 may be installed either inside a factory as a place where welding is performed. Alternatively, at least some constituent elements of the data creation system 5 may be installed outside the factory (e.g., at a business facility located at a different place from the factory).

As described above, the data creation system 5 has the function of increasing the number of the learning data items by performing the data augmentation processing on the original image (learning data). In the following description, a person who uses the data creation system 5 will be hereinafter simply referred to as a "user U1" (refer to FIG. 3). The user U1 may be, for example, an operator who monitors a manufacturing process such as a welding process step in a factory or a chief administrator.

In this embodiment, the learned model 82 is generated by machine learning as described above. The learned model 82 may be implemented as any type of artificial intelligence or system. In this example, the algorithm of machine learning may be, for example, a neural network. However, the machine learning algorithm does not have to be the neural network but may also be, for example, extreme gradient boosting (XGB) regression, random forest, decision tree, logistic regression, support vector machine (SVM), naive Bayes classifier, or k-nearest neighbors method. Alternatively, the machine learning algorithm may also be a Gaussian mixture model (GMM) or k-means clustering, for example.

Furthermore, the learned model 82 does not have to be generated by the machine learning for classifying inspection images into two classes consisting of a non-defective product and a defective product. Alternatively, the learned model 82 may also be generated by machine learning for classifying the inspection images into multiple classes including a non-defective product, a pit C1, a sputter C2, a projection C3, a burn-through C4, and an undercut C5. Still alternatively, the learned model 82 may also be generated by machine learning involving object detection and segmentation for locating a defective part on an inspection image and detecting the type of the defect.

In this embodiment, the learning method may be supervised learning, for example. However, the learning method does not have to be supervised learning but may be unsupervised learning or reinforcement learning as well.

In the example shown in FIG. 1, the data creation system 5 includes a storage device 63 for storing the learning data. The storage device 63 includes a programmable nonvolatile memory such as an electrically erasable programmable read-only memory (EEPROM). Alternatively, the storage device 63 may also be a memory built in the data creation system 5. Still alternatively, the storage device 63 may also be provided outside of the data creation system 5.

As shown in FIG. 1, the data creation system 5 includes the first image acquirer 51, the second image acquirer 52, an image processor 53, an inputter 54, a user interface 55, a setting information generator 56, a display outputter 57, and a display device 58. The data creation system 5 further includes an image outputter 59, a learner 60, a decider 61, an inspection image acquirer 62, and the storage device 63.

Among these constituent elements, at least the user interface 55, the display device 58, and the storage device 63 each have a substantive configuration. On the other hand, the first image acquirer 51, the second image acquirer 52, the image processor 53, the inputter 54, the setting information generator 56, the display outputter 57, the image outputter 59, the learner 60, the decider 61, and the inspection image acquirer 62 just represent respective functions to be performed by one or more processors of the data creation system 5 and do not necessarily have a substantive configuration.

(2) First Image Acquirer

The first image acquirer 51 acquires a first image P1 representing the first object 1 including the particular part E1. In this embodiment, the learned model 82 may be used, for example, in a weld appearance test to see if welding has been performed properly. Thus, the particular part E1 is a defective part. However, the particular part E1 does not have to be a defective part. For example, if the learned model 82 is used to determine whether there is any painting or not or whether there is any plating or not, then the particular part E1 may be a painted part or a plated part, for example.

As shown in FIG. 3, the first image P1 is an image generated by shooting the first object 1. The first image acquirer 51 may acquire the first image P1 from an external device provided outside of the data creation system 5 or from the storage device 63 of the data creation system 5, whichever is appropriate. In the example shown in FIG. 1, the first image acquirer 51 acquires the first image P1 from an external device provided outside of the data creation system 5. For example, the first image acquirer 51 may acquire the first image P1 from a computer server.

Also, an image capture device for generating the first image P1 by shooting the first object 1 may be provided inside or outside of the data creation system 5, whichever is appropriate.

The first object 1 is an object with a defective part. That is to say, the first object 1 is a defective product. As used herein, the "defective product" refers to an article in which a defect has been produced. The user U1 of the data creation system 5 may determine as appropriate what condition of the article should be regarded as a condition in which a defect has been produced.

The first image P1 is an image generated by shooting at least a defect produced spot (i.e., particular part E1) of the first object 1 (i.e., a defective product image). The first object 1 includes the first base metal 11, the second base metal 12, and the bead 13. The range shot in the first image P1 preferably covers not only the defect produced spot but also a spot, other than the defect produced spot, of the first object 1 (e.g., spots surrounding the defect produced spot) as well. In the example shown in FIG. 3, the range shot in the first image P1 includes the entire bead 13 and the first base metal 11 and second base metal 12 surrounding the bead 13 to cover the particular part E1.

In this embodiment, the first object 1 is an article formed by welding together two or more welding base materials (e.g., the first base metal 11 and the second base metal 12 in this embodiment). That is to say, the first object 1 is a welded product. Examples of the types of defects to be produced to a welded product include a pit, a sputter, a projection, a burn-through (hole), and an undercut.

As used herein, the "pit" refers to a depression produced when an air bubble produced in the welding metal surfaces and is produced on the surface of the bead 13. As used herein, the "sputter" refers to a metal particle or slug scattering at the time of welding and is a spherical or truncated cone shaped projection produced on the surface of the bead 13 and on the surface of its surroundings. The "projection" as used herein refers to a circular columnar projection produced on the surface of the bead 13. The "burn-through (hole)" as used herein refers to a missing part, which has been melted down, of the bead 13. The "undercut" as used herein refers to a depression produced around the bead 13.

The particular part E1 includes at least a part of the defective part with at least one of a pit, a sputter, a projection, a burn-through (hole), or an undercut produced to a welded product. That is to say, the particular part E1 does not necessarily have only one type of defective part but may have two or more types of defective parts at a time. Furthermore, the particular part E1 does not have to refer to the entire defective part but may include only a portion of the defective part (e.g., only a part of the undercut). In this embodiment, the particular part E1 is supposed to be a single type of defective part and cover the defective part in its entirety as an example.

The particular part E1 does not have to be a defective part but may also be a part with no defects. Alternatively, the particular part E1 may include a defective part and a part around the defective part. In particular, if the defect produced to the first object 1 is a defect produced in a narrow range (such as a pit, a sputter, or a projection), the particular part E1 preferably includes not only a single defective part but also a part around the defective part or another defective part. This ensures a sufficient length for the particular part E1, thus making the image processing on the particular part E1 more significant processing.

FIGS. 2A-2E illustrate a pit C1, a sputter C2, a projection C3, a burn-through C4, and an undercut C5, each of which may be produced in the particular part E1. In FIG. 3, the particular part E1 is schematically indicated by the solid circle. In the example illustrated in FIG. 3, the particular part E1 is present at a longitudinal lower end portion on the surface of an elongate bead 13. Note that if the defective part is an undercut, for example, the grayscale of the particular part E1 corresponds to the depth of the undercut.

(2) Second Image Acquirer

The second image acquirer 52 acquires a second image P2 representing the second object 2. As shown in FIG. 3, the second image P2 is an image generated by shooting the second object 2. The second image acquirer 52 may acquire the second image P2 from an external device provided outside of the data creation system 5 or from the storage device 63 of the data creation system 5, whichever is appropriate. In the example shown in FIG. 1, the second image acquirer 52 acquires the second image P2 from an external device provided outside of the data creation system 5. For example, the second image acquirer 52 may acquire the second image P2 from a computer server.

Also, an image capture device for generating the second image P2 by shooting the second object 2 may be provided inside or outside of the data creation system 5, whichever is appropriate.

The second object 2 is an object with no defective parts. That is to say, the second object 2 is a non-defective product. As used herein, the "non-defective product" refers to an article in which no defects have been produced. The second object 2 includes a first base metal 21, a second base metal 22, and a bead 23. In the example shown in FIG. 3, the range shot in the second image P2 covers the entire bead 23 and the first base metal 21 and the second base metal 22 located around the bead 23.

The second image P2 is an image that forms the basis of the superposed image P4. That is to say, the first base metal 21, second base metal 22, and bead 23 of the second object 2 are originals respectively corresponding to the first base metal 41, second base metal 42, and bead 43 of the object 4 shot in the superposed image P4. Note that the superposed image P4 includes the particular part E1 (defective part) which is absent from the second image P2.

(4) First Image and Second Image

The first image P1 may be, for example, a distance image including coordinate information in a depth direction (i.e., a direction pointing from the image capture device toward the first object 1). The second image P2 may be, for example, a distance image including coordinate information in a depth direction (i.e., a direction pointing from the image capture device toward the second object 2). The coordinate information in the depth direction may be expressed by, for example, grayscales. Specifically, the higher the density of a point of interest in a distance image is, the deeper the point of interest is located. Conversely, the lower the density of a point of interest in a distance image is, the deeper the point of interest may be located.

The image capture device for use to generate the distance image is a distance image sensor such as a line sensor camera. A plurality of objects are sequentially shot by the image capture device one after another, thereby generating a plurality of images. The first image P1 and the second image P2 are chosen in accordance with the user's U1 instruction from the plurality of images generated by the image capture device. The data creation system 5 preferably includes an operating unit for accepting his or her instruction about the choice. For example, the user interface 55 may be used as the operating unit.

Note that the first image P1 and the second image P2 do not have to be distance images but may also be RGB color images, for example.

(5) Image Processor

The image processor 53 may be implemented as, for example, a digital signal processor (DSP) or a field-programmable gate array (FPGA). The image processor 53 includes the segmenter 71, the range generator 72, and the creator 73 as shown in FIG. 1. The image processor 53 performs segmentation processing, range generation processing, and creation processing in accordance with setting information 81. As will be described later, the setting information 81 may be entered by the user U1 or automatically generated by the setting information generator 56, whichever is appropriate. In this embodiment, the image generated by the creator 73 will be hereinafter referred to as the "superposed image P4."

The segmenter 71 performs the segmentation processing to divide the first image P1 into a plurality of regions 3 (refer to FIG. 3) based on the pixel values of a plurality of pixels included in the first image P1, for example. In this embodiment, the first image P1 includes pixel regions representing the first base metal 11, the second base metal 12, and the bead 13, respectively. The segmenter 71 locates the pixel regions respectively representing the first base metal 11, the second base metal 12, and the bead 13 and partitions the first image P1 into three regions 3 (i.e., segments) along the boundaries between these pixel regions.

In the example illustrated in FIG. 3, a first segment 31, a second segment 32, and a third segment 33 are shown as the three regions 3. The first segment 31 is a pixel region representing the first base metal 11. The second segment 32 is a pixel region representing the second base metal 12. The third segment 33 is a pixel region representing the bead 13.

Specifically, the segmenter 71 may extract, by edge detection, for example, the respective contours and features of the particular part E1, the first base metal 11, the second base metal 12, and the bead 13 based on the discontinuity in pixel values of the first image P1, thereby automatically locating these pixel regions. Then, the segmenter 71 determines which of the plurality of regions 3 the particular part E1 is located in. In the example illustrated in FIG. 3, the particular part E1 falls within the third segment 33 (i.e., the pixel region representing the bead 13). That is to say, the plurality of regions 3 includes a particular region 3A (refer to FIG. 3) where the particular part E1 is located. In the example illustrated in FIG. 3, the third segment 33 corresponds to the particular region 3A.

Alternatively, the segmenter 71 may also use specification information detected by a setting information generator 56 (to be described later) about a pixel region representing the particular part E1, for example. At least one pixel region (e.g., a pixel region representing the particular part E1) selected from a plurality of pixel regions representing the particular part E1, the first base metal 11, the second base metal 12, and the bead 13, respectively, may be specified by the user U1 via the user interface 55. In that case, the specification information about the at least one pixel region may be included in the setting information 81.

Still alternatively, the segmenter 71 may divide the first image P1 into a plurality of regions 3 without referring to information indicating what type of object is shot in the first image P1. Specifically, the segmenter 71 may divide the first image P1 into a plurality of regions 3 by any known segmentation method such as the P-tile method, the mode method, the k-means method, or the region extension method, or by a segmentation technique by clustering.

Optionally, the type of the particular part E1 (defective part), namely, a pit C1, a sputter C2, a projection C3, a burn-through C4, or an undercut C5, may also be specified by the user U1 via the user interface 55. In that case, the information about the type of the particular part E1 may be included in the setting information 81. Alternatively, the segmenter 71 may automatically recognize the type of the particular part E1.

In short, the segmenter 71 may divide the first image P1 into a plurality of regions 3 (refer to FIG. 3) by reference to the setting information 81 and based on the pixel values on the first image P1. Nevertheless, the information about the type of the particular part E1 shot in the first image P1 is not indispensable information for the data creation system 5 to create the superposed image P4.

The range generator 72 performs range generation processing to generate, in accordance with the result of segmentation obtained by the segmenter 71, a single or plurality of (e.g., four in the example illustrated in FIG. 3) range patterns Q1 (i.e., generates a single or plurality of candidate range data items). Each of the plurality of range patterns Q1 preferably includes the particular part E1. The number of the range patterns Q1 is not limited to any particular value but may also be one. Information about the number of the range patterns Q1 generated may be included, for example, in the setting information 81.

For example, the range generator 72 may predict (generate), based on the three regions 3 respectively representing the first base metal 11, the second base metal 12, and the bead 13 and the spot where the particular part E1 is present (i.e., a defect produced spot), a single or plurality of range patterns Q1 as candidate defect produced range(s) in the first image P1. Note that the "result of segmentation" is supposed to be related to, for example, relative positional relationship between the three regions 3 and the spot where the particular part E1 is present (i.e., the defect produced spot) in the first image P1.

In this embodiment, the first object 1 shot in the first image P1 is a welded product, and therefore, the spot where the particular part E1 is present may be narrowed down to a certain degree to the surface of the bead 13 or the vicinity of the boundary between the bead 13 and the first base metal 11 or the second base metal 12. In particular, a range where the particular part E1 is actually highly likely to be present is predicted depending on the type of the particular part E1 as shown in FIGS. 2A-2E.

Figure 2A:
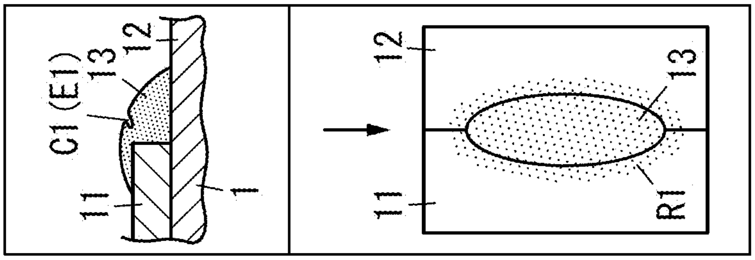
FIGS. 2A-2E are conceptual diagrams illustrating how the data creation system operates in accordance with range setting information.
Figure 2B:
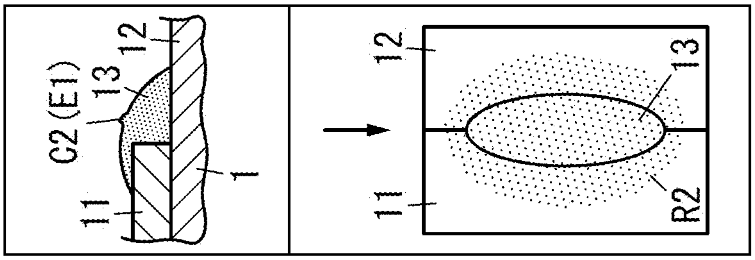
Figure 2C:
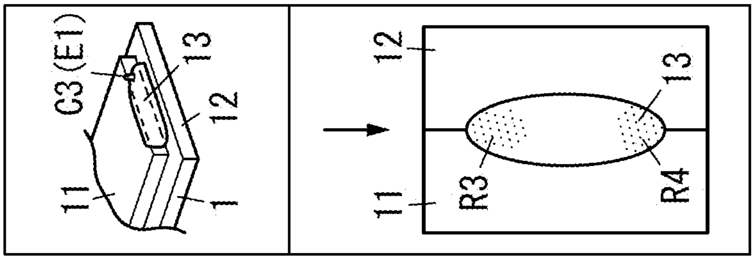
Figure 2D:
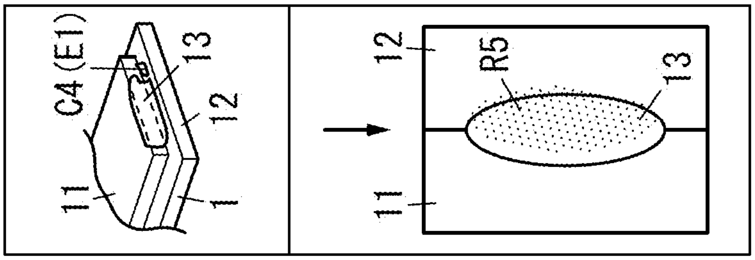
Figure 2E:
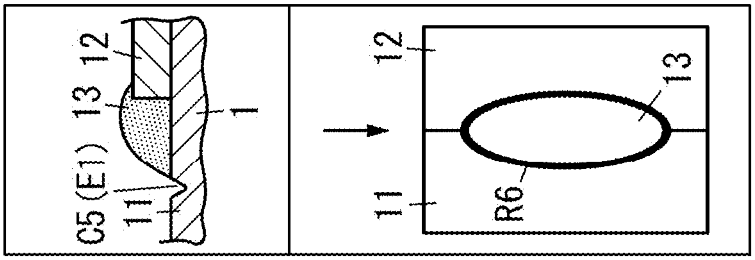

Specifically, the pit C1 may be produced at any spot falling within a range R1 of incidence (indicated by the dotted hatching) covering the entire surface of the bead 13, the vicinity of the boundary between the bead 13 and the first base metal 11, and the vicinity of the boundary between the bead 13 and the second base metal 12 as shown in FIG. 2A. The sputter C2 may be produced at any spot falling within a range R2 of incidence (indicated by the dotted hatching) which is somewhat larger in area than the range R1 of incidence of the pit C1 as shown in FIG. 2B. The projection C3 may be produced at any spot falling within a range R3 of incidence and a range R4 of incidence (both indicated by the dotted hatching) which are respectively located around both longitudinal ends of the elongate bead 13 as shown in FIG. 2C. The burn-through C4 may be produced at any spot falling within a range R5 of incidence (indicated by the dotted hatching) corresponding to almost the entire surface of the bead 13 as shown in FIG. 2D. The undercut C5 may be produced at any spot on a range R6 of incidence (indicated by the bold ellipse) along the edge of the elongate bead 13 corresponding to the boundary between the bead 13 and the first base metal 11 and the boundary between the bead 13 and the second base metal 12 as shown in FIG. 2E.

Each of these ranges R1-R6 of incidence is a range within which a defective part (particular part E1) may actually be present.

In short, there may be somewhat limited relative positional relationship between the defect produced spot and the bead 13, the first base metal 11, and the second base metal 12.

Note that the ranges R1-R6 of incidence shown in FIGS. 2A-2E are only examples and should not be construed as limiting. The range setting information about these ranges R1-R6 of incidence may be defined in advance or may be registered and changed by the user U1 via the user interface 55. The range setting information may be included in the setting information 81. Note that correspondence information showing one-to-one, one-to-multiple, or multiple-to-multiple correspondence between the type of the particular part E1 and the ranges R1-R6 of incidence is preferably included in the setting information 81.

The range generator 72 predicts (generates), by reference to the range setting information included in the setting information 81, a single or plurality of range patterns Q1 in accordance with the relative positional relationship between the three regions 3 in the first image P1 and the spot where the particular part E1 is present. In the example illustrated in FIG. 3, the spot where the particular part E1 is present is located at the lower end portion of the surface of the bead 13 (i.e., at the lower end portion of the third segment 33). As a result, the range generator 72 collates the relative positional relationship between the three regions 3 (segments) and the spot where the particular part E1 is present with the ranges R1-R6 of incidence in the range setting information, thereby determining one or more probable ranges of incidence. In the example illustrated in FIG. 3, the range generator 72 generates four range patterns Q1 (Q11-Q14) by adopting the ranges R1, R3, R4, and R5 of incidence.

Each range pattern Q1 may be generated, for example, based on pixel regions extracted from the first image P1 and representing the first segment 31, the second segment 32, the third segment 33, and the particular part E1.

The range pattern Q11 has been generated by adopting the range R1 of incidence covering the entire surface of the bead 13 and the vicinity of the boundary between the bead 13 and the base metals (11, 12). That is to say, the range generator 72 generates, as one range pattern Q1 belonging to the single or plurality of range patterns Q1, a range pattern Q11, of which the range is defined by the entire particular region 3A (third segment 33).

The range pattern Q12 has been generated by adopting the range R4 of incidence around one end portion (e.g., the second end portion 302 in the example illustrated in FIG. 3) out of both end portions (namely, the first end portion 301 and the second end portion 302) along the longitudinal axis of the elongate bead 13. That is to say, if the particular region 3A has an elongate shape (i.e., a shape which is elongate in the upward/downward direction in the example illustrated in FIG. 3), then the range generator 72 generates, as one range pattern Q1 belonging to the single or plurality of range patterns Q1, a range pattern Q12, of which the range is defined by only one end portion (i.e., second end portion 302) along the longitudinal axis of the particular region 3A. Although not shown, the range generator 72 may also generate, as one range pattern Q1 belonging to the single or plurality of range patterns Q1, a range pattern Q1, of which the range is defined by only the other end portion (i.e., first end portion 301) along the longitudinal axis of the particular region 3A.

The range pattern Q13 has been generated by adopting the ranges R3, R4 of incidence covering both end portions (namely, the first end portion 301 and the second end portion 302) along the longitudinal axis of the elongate bead 13. That is to say, if the particular region 3A has an elongate shape (i.e., a shape which is elongate in the upward/downward direction in the example illustrated in FIG. 3), then the range generator 72 generates, as one range pattern Q1 belonging to the single or plurality of range patterns Q1, a range pattern Q13, of which the range is defined by only both end portions (301, 302) along the longitudinal axis of the particular region 3A.

The range pattern Q14 has been generated by adopting the range R5 of incidence covering almost the entire surface of the bead 13. That is to say, the range generator 72 generates, as one range pattern Q1 belonging to the single or plurality of range patterns Q1, a range pattern Q14, of which the range is defined by the entire particular region 3A.

Although not shown in FIG. 3, the range generator 72 may also generate a range pattern Q1 by adopting the range R2 of incidence (refer to FIG. 2) which is somewhat larger in size than the range R1 of incidence.

Likewise, although not shown in FIG. 3, either, the range generator 72 may also generate a range pattern Q1 by adopting the range R6 of incidence (refer to FIG. 2) defined along the edge of the elongate bead 13. In other words, the range generator 72 may also generate, as one range pattern Q1 belonging to the single or plurality of range patterns Q1, a range pattern Q1, of which the range is defined by only a peripheral edge portion 303 (refer to FIG. 3) of the particular region 3A.

If the data creation system 5 has recognized the type of the particular part E1 shot in the first image P1, then the range generator 72 may generate the range pattern Q1 in accordance with not only the relative positional relationship but also the type of the particular part E1 as well. For example, the range generator 72 may generate the range pattern Q1 by selecting, by reference to the correspondence information, a range of incidence corresponding to the type of the particular part E1 from the ranges R1-R6 of incidence. This may further decrease the number of range patterns Q1 to be generated by the range generator 72.

In this embodiment, the data creation system 5 has the function of making the display device 58 (refer to FIG. 1) display the single or plurality of range patterns Q1 generated by the range generator 72. That is to say, the display outputter 57 (refer to FIGS. 1 and 3) makes the display device 58 display the single or plurality of range patterns Q1. The display outputter 57 has the single or plurality of range patterns Q1 displayed and prompts the user U1 to choose at least one (e.g., one) range pattern Q1. The display outputter 57 presents the particular part E1 at the same spot of incidence as the first image P1 with respect to each of these range patterns Q1 displayed to allow the user U1 to intuitively recognize the location of the particular part E1 as shown in FIG. 3. Although the particular part E1 is schematically indicated by the solid circle in the example illustrated in FIG. 3, the particular part E1 actually displayed on the display device 58 is preferably presented as an image representing a pit, a sputter, a projection, a burn-through, or an undercut which is shot in the first image P1.

In addition, the display outputter 57 displays the range of incidence in such a mode as to clearly indicate what range of incidence has been selectively adopted from the ranges R1-R6 of incidence and thereby allow the user U1 to intuitively recognize the range of incidence adopted (refer to the range indicated by the lighter dotted hatching) in each range pattern Q1 displayed. For example, in the range pattern Q11, the range R1 of incidence is displayed to be superposed on the image representing the first segment 31, the second segment 32, and the third segment 33 to clearly indicate what range R1 of incidence has been selectively adopted.

In addition, the display outputter 57 displays, within the range of incidence, not only the particular part E1 at the original location but also a single or plurality of particular parts E1 arranged at different locations from the original one (refer to the circles with denser dotted hatching) to allow the user U1 to intuitively recognize the range of incidence adopted. In the following description, the particular part E1 at the original location will be hereinafter referred to as a "particular part E11" and the single or plurality of particular parts E1 arranged at different locations from the original one will be hereinafter referred to as "particular part E12" for the sake of convenience (i.e., to make these two types of particular parts easily distinguishable from each other). For example, if the particular part E11 is a projection, a single or plurality of projections of the same type (particular parts E12) are displayed within the range of incidence adopted.

The image representing the particular part E12 may be a copy of (i.e., quite the same image as) the image representing the particular part E11 shot in the first image P1. Alternatively, the image representing the particular part E12 may also be an image created by subjecting the image representing the particular part E11 shot in the first image P1 to predetermined image transformation processing. The range generator 72 has the function of performing the predetermined image transformation processing. This image transformation processing may include deformation processing of subjecting the particular part E11 to scaling up or down, rotation, flipping (mirror reversal), or addition of noise, for example. This image transformation processing may further include, for example, the processing of adjusting the pixel values of the particular part E12 to reduce the sense of unnaturalness between the particular part E12 and the surrounding pixel regions. The image transformation processing may further include, for example, interpolation processing of interpolating pixels on a boundary between the particular part E12 and the surrounding pixel regions to smoothly connect the particular part E12 to the surrounding pixel regions. This allows a more natural range pattern Q1 image to be created. The interpolation processing may be performed, for example, as linear interpolation.

In this embodiment, the first image P1 is a distance image and a three-dimensional image which expresses depth by grayscales. That is to say, the range pattern Q1 includes, as grayscales, coordinate information in the depth direction of the particular part E1 and the first image P1. The range generator 72 adjusts the depth direction coordinates by changing the grayscales of the particular part E1.

The number of the particular parts E12 displayed is not limited to any particular number but is preferably set in advance according to the size of the range (R1-R6) of incidence. Information about the number of the particular parts E12 displayed may be included, for example, in the setting information 81.

In the example illustrated in FIG. 3, the display outputter 57 makes the display device 58 display ten particular parts E1 in total (consisting of one particular part E11 and nine particular parts E12) such that the particular parts E1 fall within the range R1 of incidence with respect to the range pattern Q11. The ten particular parts E1 are arranged at a predetermined density (e.g., at equal intervals). In other words, the display outputter 57 makes the display device 58 display, as one range pattern Q1 belonging to the single or plurality of range patterns Q1, the range pattern Q1 in which a plurality of particular parts E1 are superposed at a predetermined density. Displaying the plurality of particular parts E1 at a predetermined density in this manner makes it easier for the user U1 to intuitively recognize a spot where the particular part E1 is actually likely to be present. This allows the user U1 to more easily determine which range pattern Q1 is more appropriately chosen from the single or plurality of range patterns Q1.

Also, in the example illustrated in FIG. 3, the display outputter 57 makes the display device 58 display two particular parts E1 in total (namely, one particular part E11 and one particular part E12) such that these two particular parts E1 fall within the range R4 of incidence with respect to the range pattern Q12.

Furthermore, in the example illustrated in FIG. 3, the display outputter 57 makes the display device 58 display three particular parts E1 in total (namely, one particular part E11 and two particular parts E12) such that these three particular parts E1 fall within the ranges R3, R4 of incidence with respect to the range pattern Q13. That is to say, one particular part E12 is disposed within each of the ranges R3, R4 of incidence.

Furthermore, in the example illustrated in FIG. 3, the display outputter 57 makes the display device 58 display five particular parts E1 in total (namely, one particular part E11 and four particular parts E12) such that these five particular parts E1 fall within the range R5 of incidence with respect to the range pattern Q14. In the range pattern Q14, the plurality of particular parts E12 may be arranged at random, for example, unlike in the range pattern Q11. Note that the phrase "at random" as used herein does not necessarily mean that all events occur at an equal probability. For example, if the setting information 81 includes information indicating that a defect is particularly likely to be produced in a certain region 3 (e.g., probability information), then the range generator 72 may determine the locations of the particular parts E1 at random such that the higher the probability of incidence one location has, the more likely the location is selected as the location of the particular part E1.

The inputter 54 according to this embodiment accepts a command entry for choosing at least one range pattern Q1 from the single or plurality of range patterns Q1 displayed.

The user U1 chooses at least one range pattern Q1 using the user interface 55, for example. The user U1 chooses a range pattern Q1 that he or she finds appropriate according to his or her own knowledge and experience. In some cases, the user U1 may find none of the range patterns Q1 displayed appropriate. The user U1 may instruct, via the user interface 55, the range pattern Q1 to be corrected. That is to say, the inputter 54 also accepts a command entry about a correction to be made to the range pattern Q1. Examples of such corrections to be made to the range pattern Q1 are supposed to include changing the range of incidence into another range of incidence not displayed, making correction such as scaling up or down to the range of incidence, and correcting the location of the particular part E1.

If the number of the range patterns Q1 generated by the range generator 72 is one, then the display outputter 57 makes the one range pattern Q1 displayed to request the user U1 to confirm and answer whether he or she agrees to creating a superposed image P4 using that one range pattern Q1. Note that the number of the range patterns Q1 that may be chosen by the user U1 is not limited to any particular number but may also be two, for example.

The creator 73 performs creation processing to create, for example, a plurality of superposed images P4 and output the plurality of superposed images P4 as learning data. The creator 73 superposes, based on one range pattern Q1 chosen, for example, by the user U1 from the single or plurality of range patterns Q1, the particular part E1 on the second image P2 to create the plurality of superposed images P4. Note that the number of superposed images P4 created based on the one range pattern Q1 is not limited to any particular number. Information about the number of the superposed images P4 created may be included, for example, in the setting information 81. The creator 73 creates a single or plurality of superposed images P4 in accordance with the command entry accepted by the inputter 54. Alternatively, the creator 73 may create a single or plurality of superposed images P4 by automatically selecting at least one range pattern Q1 from the single or plurality of range patterns Q1.

FIG. 3 illustrates an example in which the user U1 has chosen the range pattern Q12 from the four range patterns Q1. The creator 73 creates the four superposed images P4 (P41-P44) in accordance with the command that the range pattern Q12 be chosen accepted by the inputter 54. Note that in the example illustrated in FIG. 3, the user U1 has not only chosen the range pattern Q12 but also instructed making a correction of adding a range R3 of incidence to within the range pattern Q12 by using the user interface 55. As a result, the creator 73 creates superposed images P41-P44 by superposing a single or plurality of particular parts E1 at random, for example, somewhere in the regions corresponding to the ranges R3, R4 of incidence within the second image P2. In these four superposed images P41-P44, the particular part E1 is present at mutually different locations. Although the ranges R3, R4 of incidence are illustrated in FIG. 3 in the four superposed images P41-P44 to make the concept of the present disclosure easily understandable, the ranges R3, R4 of incidence are not superposed in the superposed image P4 actually output by the creator 73.

When superposing the particular part E1 on a region corresponding to the range R3, R4 of incidence within the second image P2, the creator 73 may subject, for example, the particular part E1 to image transformation processing. This image transformation processing may include deformation processing of subjecting the particular part E1 to scaling up or down, rotation, flipping (mirror reversal), or addition of noise, for example, to allow the particular part E1 to fit the second image P2 on which the particular part E1 is going to be superposed. This image transformation processing may further include the processing of adjusting the pixel values of the particular part E1 to reduce the sense of unnaturalness between the particular part E1 and the pixel regions to surround the particular part E1. The image transformation processing may further include interpolation processing of interpolating pixels on a boundary between the particular part E1 and the surrounding pixel regions to smoothly connect the particular part E1 to the surrounding pixel regions. This allows a more natural superposed image P4 to be created. The interpolation processing may be performed, for example, as linear interpolation.

In this embodiment, the superposed image P4 is a distance image and a three-dimensional image which expresses depth by grayscales. That is to say, the superposed image P4 includes, as grayscales, coordinate information in the depth direction of the particular part E1 and the second image P2. The creator 73 adjusts the depth direction coordinates by changing the grayscales of the particular part E1 to superpose.

The location of the particular part E1 in the superposed image P4 is preferably different from, but may be substantially the same as, the location of the particular part E1 in the original first image P1. For example, the bead 13 of the first image P1 and the bead 23 of the second image P2 may have mutually different sizes or shapes. Thus, even if the location of the particular part E1 in the superposed image P4 is substantially the same as the location of the particular part E1 in the first image P1, the superposed image P4 is not necessarily totally the same as the first image P1, and therefore, does have a value as learning data.

The superposed image P4 thus created is an image in which the particular part E1 is displayed (i.e., a defective product image).

(6) Setting Information

Next, the setting information 81 for use to define the processing to be performed by the image processor 53 will be described. The setting information 81 is information about the processing of creating the superposed image P4.

The inputter 54 acquires the setting information 81. The inputter 54 acquires the setting information 81 from the user interface 55 which accepts the user's U1 operation of entering the setting information 81. The user interface 55 includes at least one selected from the group consisting of, for example, a mouse, a keyboard, and a touch pad.

Examples of pieces of information included in the setting information 81 will be enumerated one after another. Note that these are only exemplary pieces of the setting information 81 and should not be construed as limiting. Rather, the setting information 81 may also include other pieces of information.

The setting information 81 may include specification information for use to specify at least one pixel region (representing the particular part E1, for example) selected from the pixel regions respectively representing the particular part E1, the first base metal 11, the second base metal 12, and the bead 13 in the first image P1. The setting information 81 may also include type information specifying the type of the particular part E1 (namely, a pit C1, a sputter C2, a projection C3, a burn-through C4, or an undercut C5) in the first image P1. The setting information 81 may further include information specifying the number of the range patterns Q1 generated. The setting information 81 may further include range setting information about the ranges R1-R6 of incidence. The setting information 81 may further include correspondence information showing one-to-one, one-to-multiple, or multiple-to-multiple correspondence between the type of the particular part E1 which may be present and the ranges R1-R6 of incidence. The setting information 81 may further include information specifying the number of particular parts E12 falling within the range pattern Q1 displayed on the display device 58. The setting information 81 may further include information about the choice and correction of the range pattern Q1 accepted from the user U1. The setting information 81 may further include information specifying the number of superposed images P4 which may be created from a single first image P1.

The setting information generator 56 generates at least a part of the setting information 81. The setting information generator 56 may define the pixel region of the particular part E1 in the first image P1 using, for example, a predetermined learned model for detecting the particular part E1 (defective part) from the first image P1.

Optionally, the setting information generator 56 may attach a label to the superposed image P4. The setting information generator 56 may determine the label to be attached to the superposed image P4 according to the label attached to the first image P1, for example. Specifically, if the label attached to the first image P1 is a label "defective product," then the setting information generator 56 may attach the label "defective product" to the superposed image P4. In that case, the label may include the type of the defect, which may be the same as the type of defect of the first image P1.

(7) Display Outputter and Display Device

The display outputter 57 outputs information to the display device 58. In response, the display device 58 conducts a display operation in accordance with the information that the display device 58 has received from the display outputter 57.

The display device 58 includes a display. The display may be, for example, a liquid crystal display or an organic electroluminescent (EL) display. The display device 58 may display, for example, the first image P1, the second image P2, the range pattern Q1, and the superposed image P4. The display device 58 may be used as an output interface for conducting a display operation about the setting information 81 while the user U1 is entering the setting information 81 into the user interface 55. The user U1 may, for example, define the range of the particular part E1 in the first image P1 by operating the user interface 55 to move the cursor displayed on the display device 58 when the first image P1 is displayed on the display device 58. In addition, when a plurality of range patterns Q1 are displayed on the display device 58, the user U1 may also choose an appropriate range pattern Q1 or correct either the location or the range (R1-R6) of incidence of the particular part E1 by operating the user interface 55 to move the cursor displayed on the display device 58. Furthermore, the display device 58 displays the decision result 83 provided by the decider 61 (to be described later).

(9) Machine Learning and Go/No-Go Decision

The image outputter 59 outputs the superposed image P4 created by the image processor 53 to the learner 60. The learner 60 makes machine learning using the superposed image P4 as learning data (or learning dataset). In this manner, the learner 60 generates a learned model 82. As described above, the learner 60 may use not only the superposed image P4 but also the first image P1 and the second image P2 as the learning data.

The learning dataset is generated by attaching not only a label "non-defective" or "defective" to each of a plurality of image data items but also a label indicating the type and location of the defect to each of a plurality of image data items in the case of a defective product. The operation of attaching the label may be performed by, for example, the user U1 via the user interface 55. Alternatively, the operation of attaching the label may also be performed by the setting information generator 56. The learner 60 generates a learned model 82 by machine-learning the conditions (such as a non-defective condition, a defective condition, the type of the defect, and the location of the defect) of the object using the learning dataset.

Optionally, the learner 60 may attempt to improve the performance of the learned model 82 by making re-learning using a learning dataset including newly acquired learning data. For example, if a new type of defect has been found in the object, then the learner 60 may be made to make re-learning about the new type of defect.

On a production line at a factory, for example, the image capture device shoots an object to generate an inspection image P5. More specifically, the image capture device shoots an object on which a bead has been formed by actually going through a welding process, thereby generating the inspection image P5. The inspection image acquirer 62 acquires the inspection image P5 from the image capture device. The decider 61 makes, using the learned model 82 generated by the learner 60, a go/no-go decision of the inspection image P5 (object) acquired by the inspection image acquirer 62. In addition, if the object is a defective product, the decider 61 also determines what type of defect has been detected and where the defect is located. The decider 61 outputs the decision result 83. The decision result 83 is output to the display device 58, for example. In response, the display device 58 displays the decision result 83. This allows the user U1 to check the decision result 83 on the display device 58. Alternatively, the manufacturing equipment may also be controlled such that an object recognized to be a defective product by the decider 61 is discarded before being passed to the next processing step. The decision result 83 may be output to, and stored in, the data server, for example.

As described above, the data creation system 5 includes the inspection image acquirer 62 for acquiring the inspection image P5 and the decider 61 for making a go/no-go decision of the inspection image P5 using the learned model 82. The learned model 82 is generated based on the superposed image P4 generated by the image processor 53.

(9) Flow of Operation

Figure 4:
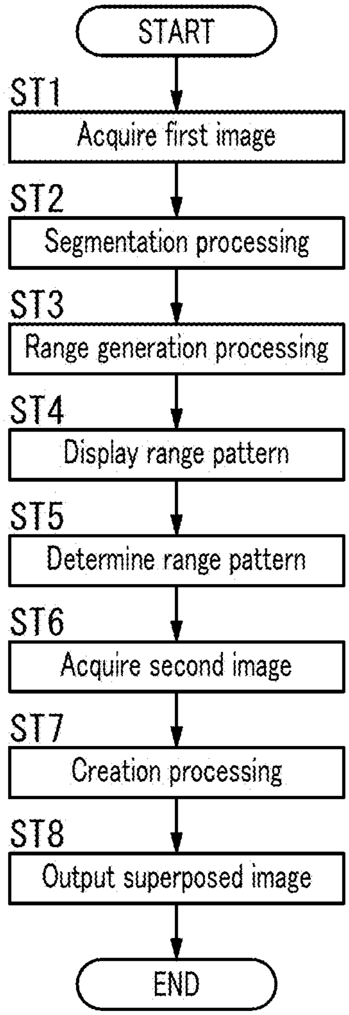
FIG. 4 is a flowchart showing an exemplary procedure of operation of the data creation system.

Next, the flow of the processing performed by the data creation system 5 to generate the superposed image P4 will be described with reference to FIG. 4. Note that the flow shown in FIG. 4 is only an example and should not be construed as limiting. Optionally, the processing steps shown in FIG. 4 may be performed in a different order from the illustrated one, some of the processing steps shown in FIG. 4 may be omitted as appropriate, and/or an additional processing step may be performed as needed.

First, the first image acquirer 51 performs first image acquisition processing to acquire a first image P1 representing a first object 1 and including a particular part E1 (in Step ST1). Next, the image processor 53 performs segmentation processing to divide the first image P1 into a plurality of regions 3 (in Step ST2). As a result, a first segment 31, a second segment 32, and a third segment 33 are formed.

Next, the image processor 53 performs range generation processing to generate a plurality of range patterns Q1 (in Step ST3). Then, the display outputter 57 makes the display device 58 display the plurality of range patterns Q1 thus generated (in Step ST4). The user U1 visually checks the plurality of range patterns Q1 displayed on the display device 58 and chooses, via the user interface 55, either one or plurality of range patterns Q1 that he or she finds appropriate. The inputter 54 accepts the command entered by the user U1 about his or her choice of the one or plurality of range patterns Q1. The image processor 53 determines the range pattern Q1 in accordance with the command entry accepted by the inputter 54 (in Step ST5).

Next, the second image acquirer 52 performs second image acquisition processing to acquire a second image P2 representing a second object 2 (in Step ST6).

Then, the image processor 53 performs creation processing to superpose the particular part E1 on the second image P2 in accordance with the range pattern Q1 thus determined and thereby create a single or plurality of superposed images P4 (in Step ST7). If the number of superposed images P4 to create has been set in advance, then the image processor 53 continues to create the superposed images P4 until the number of the superposed images P4 created reaches the number. Thereafter, the image processor 53 outputs, as learning data, the single or plurality of superposed images P4 thus created by the creation processing (in Step ST8) to end the process.

Optionally, the data creation system 5 may use the superposed image P4 that has been created by the image processor 53 as the first image P1 when another superposed image P4 is created next time.

Advantages

The data creation system 5 according to this embodiment may create an image (superposed image P4) suitable for machine learning. In particular, the particular part E1 is superposed on the second image P2 in accordance with the range pattern Q1. Thus, according to this embodiment, a spot where the particular part E1 is likely to be present (i.e., a spot where a defect is likely to be produced) is not located from a statistical point of view unlike the data generator of Patent Literature 1, for example. This reduces the chances of causing a decline in the accuracy of the learning data due to the shortage of images covering the particular part E1 (i.e., defective product images). In addition, according to this embodiment, the synthesized spot is not located based on the degree of similarity between the original image and the synthesized image unlike the data generator of Patent Literature 1, thus reducing the chances of causing a decline in the accuracy of learning data. Consequently, the data creation system 5 according to this embodiment achieves the advantage of contributing to improving the accuracy of learning data.

In addition, the particular part E1 is a defective part and the first object 1 is an object with the defective part. The second object 2 is an object without the defective part. This improves the accuracy of learning data for generating a learned model 82 to recognize a defective part.

In particular, the data creation system 5 according to this embodiment makes the display device 58 display the range pattern Q1 to create a single or plurality of superposed images P4 in accordance with the range pattern Q1 chosen by the user U1. This increases the chances of creating a superposed image P4 disposed at a spot where the particular part E1 is actually likely to be present, compared to a situation where the data creation system 5 performs all processing automatically without allowing the user U1 to make a visual check.

First Variation

Next, a data creation system 5 according to a first variation will be described with reference to FIG. 5. In the following description, any constituent element of this first variation, having substantially the same function as a counterpart of the embodiment described above, will be designated by the same reference numeral as that counterpart's, and description thereof will be omitted herein.

In the exemplary embodiment described above, the object is supposed to be a welded product as an example. However, this is only an example and should not be construed as limiting. Rather, the data creation system 5 is also applicable to even a situation where the object is an unknown article other than the welded product. In this first variation, the object is supposed to be an article other than the welded product, e.g., a plate member having a surface on which a plurality of projections (such as the heads of screws) are arranged in matrix, for example. In the first variation, the learned model 82 is used to recognize any defective part which may be present in such a plate member.

Specifically, the first image P1 may be, for example, a distance image. A first object 1 shot in the first image P1 includes a plate-shaped base material 14 (such as a metallic plate) and nine projections 15 (e.g., metallic projections such as the heads of screws) which are arranged in matrix on the surface of the base material 14. The surface of the base material 14 is a gently curved surface such as the surface of a circular cylinder as shown in FIG. 5. The first object 1 is an object with a defective part. That is to say, the first object 1 is a defective product. The first image P1 is an image generated by shooting at least a defect produced spot (particular part E1) of the first object 1 (i.e., a defective product image). The particular part E1 may be, for example, a scratch, a dent, or a depression which may be present on the surface of the projections 15. In the example shown in FIG. 5, the particular part E1 is present on the surface of a lower left projection 15 belonging to the nine projections 15.

A second image P2 may be, for example, a distance image. A second object 2 shot in the second image P2 is an object without the defective part. That is to say, the second object 2 is a non-defective product. The second object 2 includes a plate-shaped base material 24 (such as a metallic plate) and nine projections 25 (e.g., metallic projections such as the heads of screws) which are arranged in matrix on the surface of the base material 24. The surface of the base material 24 is a flat surface unlike the base material 14 of the first object 1. In other words, the first object 1 is different in the shape of the base material from the second object 2.

A superposed image P4 may be, for example, a distance image. An object 4 shot in the superposed image P4 includes a plate-shaped base material 44 and nine projections 45 which are arranged in matrix on the surface of the base material 44. The second image P2 is an image which forms the basis of the superposed image P4. That is to say, the base material 24 and nine projections 25 of the second object 2 correspond to the originals of the base material 44 and nine projections 45 of the object 4 in the superposed image P4. Nevertheless, the superposed image P4 includes a particular part E1 (defective part) which is absent from the second image P2.

Figure 5:
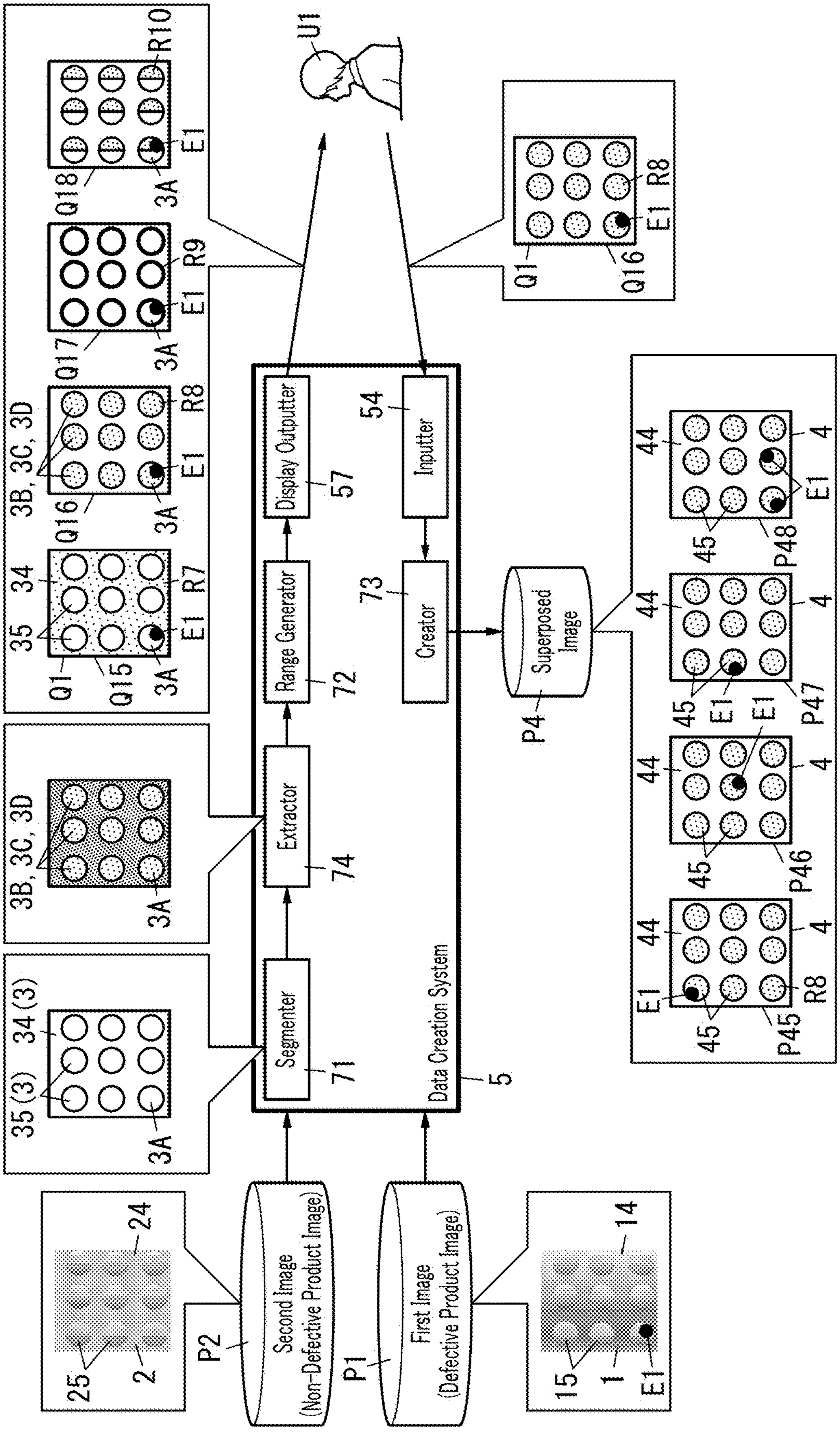
FIG. 5 is a conceptual diagram illustrating a plurality of images generated along the flow of a series of operations performed by a data creation system according to a first variation of the exemplary embodiment.

In the first variation, the segmenter 71 performs the segmentation processing to divide the first image P1 into a plurality of regions 3 (refer to FIG. 5). In the first variation, the segmenter 71 locates the pixel regions representing the base material 14 and the nine projections 15 and divides the first image P1 into ten regions 3 along the boundary between these pixel regions.

In the example illustrated in FIG. 5, a first segment 34 and nine second segments 35 are shown as the ten regions 3. The first segment 34 is the pixel region representing the base material 14. Each of the second segments 35 is the pixel region representing a corresponding one of the projections 15. The segmenter 71 determines which of the plurality of regions 3 the particular part E1 is present in. In the example illustrated in FIG. 5, the particular part E1 is included in the lower left second segment 35 (i.e., the pixel region representing one of the projections 15). That is to say, the plurality of regions 3 includes a particular region 3A (refer to FIG. 5) where the particular part E1 is located. In the example illustrated in FIG. 5, the lower left second segment 35 corresponds to the particular region 3A.

In this case, the data creation system 5 according to the first variation further includes an extractor 74 (refer to FIG. 5) which performs first, second, and third extraction processing (to be described later) unlike the exemplary embodiment described above. The function of the extractor 74 is provided for the image processor 53 (refer to FIG. 1).

The extractor 74 performs first extraction processing to extract, from the plurality of regions 3 (i.e., from the first image P1), a single or plurality of similar-in-shape regions 3B, of which the shape has a high degree of similarity to the shape of the particular region 3A. In the example illustrated in FIG. 5, the particular region 3A (i.e., the lower left second segment 35) has a circular geometric shape, while the eight other second segments 35 each also have a circular geometric shape. As a result, the extractor 74 extracts, as similar-in-shape regions 3B, the eight other second segments 35, each having a geometric shape with a high degree of similarity to the geometric shape of the particular region 3A. The degree of similarity may be calculated by any appropriate technique. The extractor 74 generates a template image by extracting geometric features (such as edges) from the particular region 3A. In addition, the extractor 74 also makes pattern matching with the template image with respect to each of the other regions 3, thereby calculating a correlation coefficient (indicating the degree of similarity) with the template image. The extractor 74 determines a region 3, having a degree of similarity higher than a predetermined value, to be a similar-in-shape region 3B. Note that an index to the degree of similarity does not have to be the correlation coefficient (indicating the degree of similarity) but may also be a distance (indicating the degree of difference), which indicates that the smaller the distance value is, the higher the degree of similarity is. In that case, the extractor 74 determines a region 3, of which the distance is less than a reference value, to be a similar-in-shape region 3B.

Note that if no regions with a high degree of similarity are extracted, then adjustment may be made to extract at least one region with a high degree of similarity by changing the predetermined value (threshold value). The predetermined value (threshold value) is preferably changeable via the user interface 55, for example.

In addition, the extractor 74 performs second extraction processing to extract, from the plurality of regions 3 (i.e., from the first image P1), a single or plurality of similar-in-pixel regions 3C including a plurality of pixels, of which the pixel values have a high degree of similarity to the pixel values of a plurality of corresponding pixels of the particular region 3A. In the example illustrated in FIG. 5, the pixel values of the plurality of pixels in the particular region 3A (i.e., the lower left second segment 35) have a high degree of similarity to the pixel values of the plurality of pixels in each of the eight other second segments 35. As a result, the extractor 74 extracts, as similar-in-pixel regions 3C, the eight other second segments 35. The degree of similarity in the pixel values of the plurality of pixels may also be calculated by any appropriate technique. The extractor 74 makes pattern matching, thereby calculating a correlation coefficient (or distance) with the other regions 3 on the basis of each pixel of the particular region 3A, thereby extracting the similar-in-pixel regions 3C.

Furthermore, the extractor 74 performs third extraction processing to extract, from the plurality of regions 3 (i.e., from the first image P1), a single or plurality of similar-in-balance regions 3D including a plurality of pixels, of which the pixel values have balance with a high degree of similarity to the balance in pixel values of a plurality of corresponding pixels of the particular region 3A. In the example illustrated in FIG. 5, the balance in pixel values over the plurality of pixels in the particular region 3A (i.e., the lower left second segment 35), specifically, the balance in the number of pixels from the color white through the color black, has a high degree of similarity to the balance in pixel values over the plurality of pixels in each of the eight other second segments 35. As a result, the extractor 74 extracts, as similar-in-balance regions 3D, the eight other second segments 35. The degree of similarity in the balance in pixel values (i.e., the balance in the number of pixels from the color white through the color black) may also be calculated by any appropriate technique. The extractor 74 makes pattern matching, thereby calculating a correlation coefficient (or distance) between the balance in the number of pixels in the particular region 3A and the balance in the number of pixels in the other regions 3, thereby extracting the similar-in-balance regions 3D.

In the first variation, the extractor 74 performs all of the first, second, and third extraction processing. Alternatively, the extractor 74 may perform only one or two types of processing selected from the group consisting of the first, second, and third extraction processing.

In the example illustrated in FIG. 5, the extraction results of the first to third extraction processing perfectly agree with each other. That is to say, the extractor 74 extracts the same regions 3 (i.e., the eight other second segments 35) with respect to all of the similar-in-shape regions 3B, the similar-in-pixel regions 3C, and the similar-in-balance regions 3D. However, the extraction results of the first to third extraction processing do not always perfectly agree with each other. If there is any difference, then the extractor 74 may provide only the extraction results that agree with each other for the range generator 72 that follows the extractor 74. Alternatively, no matter whether there is any difference or not, the extractor 74 may provide all the extraction results to the range generator 72 that follows the extractor 74.

Optionally, the extraction result obtained by the extractor 74 may be displayed on the display device 58 via the display outputter 57 and presented to the user U1. The user U1 may visually check the extraction results displayed on the display device 58 and make some command entry (e.g., giving an answer pointing out an error in the similar-in-shape regions 3B) into the inputter 54. The user's answer accepted by the inputter 54 may be fed back to the extraction processing by the extractor 74.

The extraction results of the first to third extraction processing may indicate that there are no regions 3 with a high degree of similarity to the particular region 3A and no similar-in-shape regions 3B, similar-in-pixel regions 3C, or similar-in-balance regions 3D may be extracted. In that case, a message indicating that there are no regions 3 with a high degree of similarity is preferably displayed on the display device 58 via the display outputter 57 to notify the user U1 to that effect. Then, the user U1 may abort the processing of creating the superposed image P4 and enter, into the inputter 54, a command of changing at least one of the first image P1 or the second image P2 into a different image.

The range generator 72 performs the range generation processing, thereby generating, based on the result of segmentation obtained by the segmenter 71 and the extraction result obtained by the extractor 74, a single or plurality of range patterns Q1 (e.g., four range patterns Q15-Q18 in the example illustrated in FIG. 5) for the first image P1. Specifically, the range generator 72 generates, as one range pattern Q1 belonging to the single or plurality of range patterns Q1, a range pattern Q1 including the particular region 3A and a single or plurality of similar-in-shape regions 3B. In addition, the range generator 72 also generates, as one range pattern Q1 belonging to the single or plurality of range patterns Q1, a range pattern Q1 including the particular region 3A and a single or plurality of similar-in-pixel regions 3C. Furthermore, the range generator 72 further generates, as one range pattern Q1 belonging to the single or plurality of range patterns Q1, a range pattern Q1 including the particular region 3A and a single or a plurality of similar-in-balance regions 3D. Each of the plurality of range patterns Q1 preferably includes the particular part E1.

For example, the range generator 72 predicts (or generates) a single or plurality of range patterns Q1 based on ten regions 3 in total consisting of the base material 14 and the nine projections 15, the spot where the particular part E1 is present (i.e., the defect produced spot), the similar-in-shape regions 3B, the similar-in-pixel regions 3C, and the similar-in-balance regions 3D.

In the exemplary embodiment described above, there is somewhat limited relative positional relationship between the defect produced spot, the bead 13, the first base metal 11, and the second base metal 12, and range setting information about the ranges R1-R6 of incidence is included in advance in the setting information 81. In this first variation, there may also be somewhat limited relative positional relationship between the spot where a defect such as a scratch, a dent, or a depression has been produced, the base material 14, and the nine projections 15. In the first variation, range setting information about the range of incidence of the particular part E1 such as a scratch, a dent, or a depression may also be included in the setting information 81. Alternatively, there may also be no range setting information.

The range generator 72 predicts (or generates) a single or plurality of range patterns Q1 in accordance with the relative positional relationship between the ten regions 3 in the first image P1 and the spot where the particular part E1 is present (by reference to the range setting information included, if any, in the setting information 81). In the first variation, the extraction result has been obtained by the extractor 74 as described above, and therefore, the range generator 72 may predict a single or plurality of range patterns Q1 even without the range setting information. In the example illustrated in FIG. 5, a result has been obtained to indicate that the spot where the particular part E1 is present is located at the lower left projection 15 (i.e., the lower left second segment 35) and the eight other second segments 35 correspond to the similar-in-shape regions 3B, the similar-in-pixel regions 3C, and the similar-in-balance regions 3D. The range generator 72 generates the four range patterns Q1 (Q15-Q18) based on these pieces of information.

Each range pattern Q1 may be generated based on, for example, the respective pixel regions representing the first segment 34, the nine second segment 35, and the particular part E1 that have been extracted from the first image P1.

The range pattern Q15 is a range pattern Q1 in which only the first segment 34 (i.e., the pixel region representing the base material 14) is defined to be a range R7 (indicated by the dotted hatching) where the particular part E1 may be present. If the defect is a scratch, for example, the defect may be produced on the surface of the base material 14. Also, if the number of such defective product images is small, such images are valuable as learning data.

The range pattern Q16 is a range pattern Q1 in which only the particular region 3A and the eight other second segments 35 (which may be similar-in-shape regions 3B, similar-in-pixel regions 3C, or similar-in-balance regions 3D) are defined in their entirety to be a range R8 (indicated by the dotted hatching) where the particular part E1 may be present.

The range pattern Q17 is a range pattern Q1 in which only peripheral edge portions of the particular region 3A and the eight other second segments 35 are defined to be a range R9 where the particular part E1 may be present.

The range pattern Q18 is a range pattern Q1 in which only approximately respective right halves of the particular region 3A and the eight other second segments 35 are defined to be a range R10 (indicated by the dotted hatching) where the particular part E1 may be present. Although not shown in FIG. 5, a range pattern Q1 in which only approximately respective left halves, approximately respective upper halves, or approximately respective lower halves of the particular region 3A and the eight other second segments 35 are defined to be a range where the particular part E1 may be present may also be generated.

If the data creation system 5 has recognized the type of the particular part E1 shot in the first image P1, then the range generator 72 may generate the range pattern Q1 in accordance with not only the relative positional relationship but also the type of the particular part E1 as well.

The display outputter 57 has the plurality of range patterns Q1 displayed on the display device 58. The display outputter 57 presents the particular part E1 at the same spot of incidence as the first image P1 with respect to each of these range patterns Q1 displayed as shown in FIG. 5 to allow the user U1 to intuitively recognize the location of the particular part E1. In addition, the display outputter 57 has the range R7-R10 where the particular part E1 may be present displayed in a highlighted form to allow the user U1 to intuitively recognize the range R7-R10. Although not shown in FIG. 5, the display outputter 57 may place, within each of the ranges R7-R10, not only the particular part E1 at the original location but also a single or plurality of particular parts E1 at different location(s) from the original one.

The creator 73 performs the creation processing to create, for example, a plurality of superposed images P4 and output the plurality of superposed images P4 as learning data. FIG. 5 illustrates an example in which the user U1 has chosen the range pattern Q16 from the four range patterns Q1. The creator 73 creates the four superposed images P4 (P45-P48) in accordance with the command that the range pattern Q16 be chosen accepted by the inputter 54. In these four superposed images P45-P48, the particular part E1 is placed at mutually different locations. In particular, in the superposed image P48, two particular parts E1 are superposed. The creator 73 superposes the particular part E1 within a region corresponding to the range R8 in the second image P2. When superposing the particular part E1, the creator 73 subjects the particular part E1 to image transformation processing. In the example illustrated in FIG. 5, in any of the four superposed images P4, the particular part E1 is placed, according to the type of the particular part E1 to be superposed, within the pixel region representing the corresponding projection 45 to be adjacent to the base material 44.

The superposed image P4 thus created is an image (defective product image) in which the particular part E1 is displayed. This first variation also increases the chances of creating a superposed image P4 in which the particular part E1 is disposed at a spot where the particular part E1 may actually be present, thus further improving the accuracy of the learning data.

Second Variation

Next, a data creation system 5 according to a second variation will be described with reference to FIG. 6. The second variation is a further modification to the first variation described above. Thus, in the following description, any constituent element of this second variation, having substantially the same function as a counterpart of the first variation described above, will be designated by the same reference numeral as that counterpart's, and description thereof will be omitted herein.

The first image P1 and the second image P2 may be acquired by shooting the first object 1 (defective product) and the second object 2 (non-defective product), respectively, while the first object 1 and the second object 2 are being carried (transported) by a carrier such as a conveyor. In that case, as shown in FIG. 6, a plurality of projections 15 (such as the respective heads of screws) in the first image P1 and a plurality of projections 25 (such as the respective heads of screws) in the second image P2 may be shot to shift from each other as shown in FIG. 6.

Figure 6:
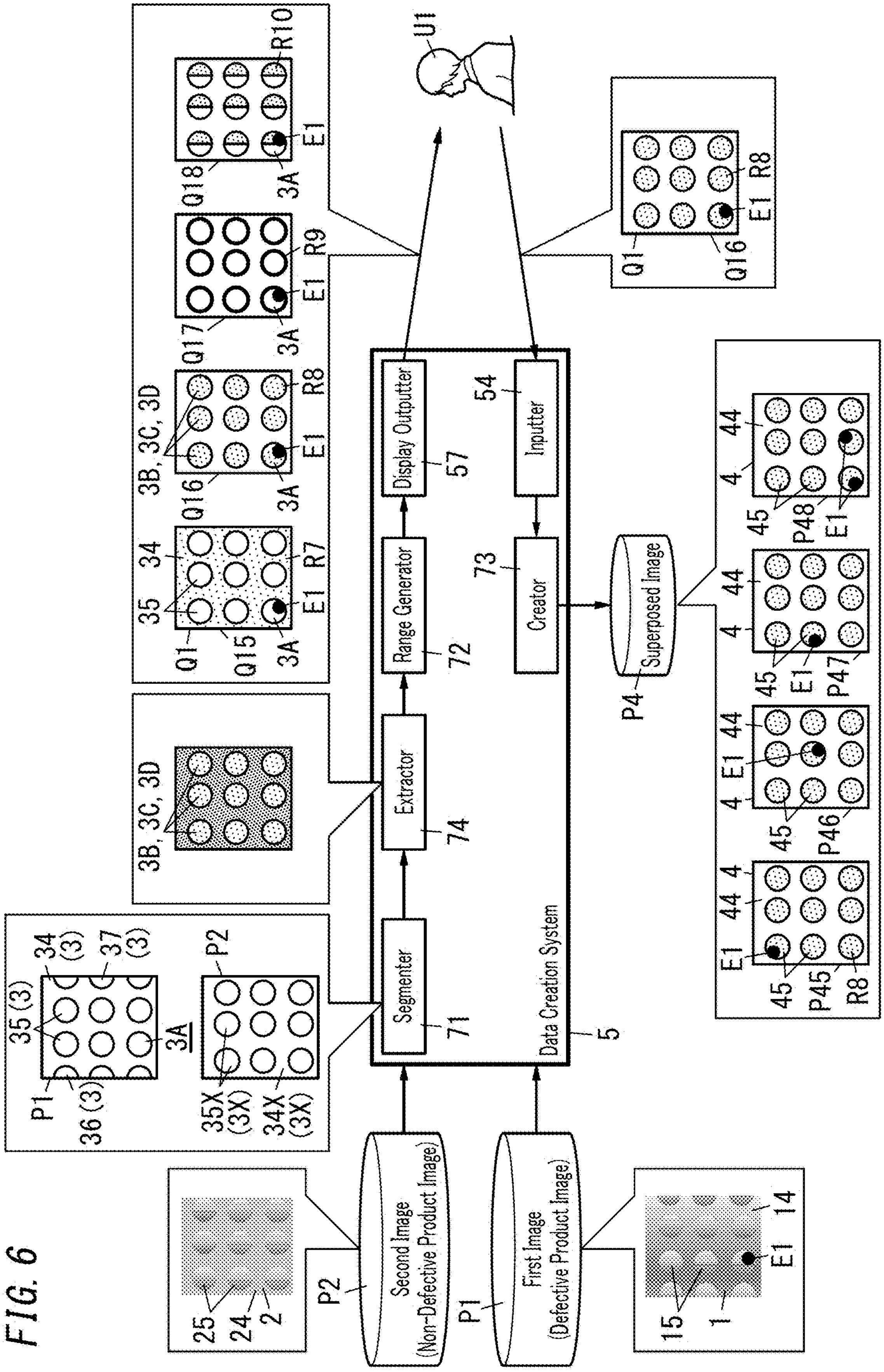
FIG. 6 is a conceptual diagram illustrating a plurality of images generated along the flow of a series of operations performed by a data creation system according to a second variation of the exemplary embodiment.

In the first image P1 shown in FIG. 6, twelve projections 15 have been shot. However, the three projections 15 at the left end and the three projections 15 at the right end have been shot only partially to approximately their right or left halves. On the other hand, in the second image P2 shown in FIG. 6, nine projections 25 have been shot, i.e., the same as the second image P2 according to the first variation.

In the second variation, the segmenter 71 performs the segmentation processing to divide the first image P1 into a plurality of regions 3 (refer to FIG. 6). In the second variation, the segmenter 71 locates the pixel regions representing the base material 14 and the twelve projections 15 and divides the first image P1 into thirteen regions 3 along the boundary between these pixel regions.

In the example illustrated in FIG. 6, one first segment 34, six second segments 35, three third segments 36, and three fourth segments 37 are shown as the thirteen regions 3. The first segment 34 is the pixel region representing the base material 14. Each of the second segments 35 is the pixel region representing a corresponding one of the projections 15. Each of the third segments 36 is the pixel region representing the right half of a corresponding one of the projections 15. Each of the fourth segments 37 is the pixel region representing the left half of a corresponding one of the projections 15.

The segmenter 71 determines which of the plurality of regions 3 the particular part E1 is present in. In the example illustrated in FIG. 6, the particular part E1 is included in the lower left second segment 35 (i.e., the pixel region representing one of the projections 15). That is to say, the plurality of regions 3 includes a particular region 3A (refer to FIG. 6) where the particular part E1 is located. In the example illustrated in FIG. 6, the lower left second segment 35 corresponds to the particular region 3A.

Unlike the exemplary embodiment and the first variation described above, the segmenter 71 performs the segmentation processing on not only the first image P1 but also the second image P2 as well. In other words, the segmenter 71 according to the second variation divides each of the first image P1 and the second image P2 into a plurality of regions (3, 3X). The segmenter 71 locates the pixel regions representing the base material 24 and the twelve projections 25 and divides the second image P2 into ten regions 3X along the boundary between these pixel regions.

In the example illustrated in FIG. 6, a first segment 34X and nine second segment 35X are shown as the ten regions 3X of the second image P2.

Then, in this second variation, the extractor 74 performs first, second, and third extraction processing. Unlike the first variation, the extractor 74 extracts, in this second variation, a region with a high degree of similarity in shape to the particular region 3A from the second image P2, not from the first image P1.

The extractor 74 performs the first extraction processing to extract, from the ten regions 3X (i.e., from the second image P2), a single or plurality of similar-in-shape regions 3B, of which the shape has a high degree of similarity to the shape of the particular region 3A. In the example illustrated in FIG. 6, the particular region 3A (i.e., the lower left second segment 35) has a circular geometric shape, while the nine other second segments 35X of the second image P2 each also have a circular geometric shape. As a result, the extractor 74 extracts, as similar-in-shape regions 3B, the nine other second segments 35X.

In addition, the extractor 74 performs the second extraction processing to extract, from the ten regions 3X (i.e., from the second image P2), a single or plurality of similar-in-pixel regions 3C including a plurality of pixels, of which the pixel values have a high degree of similarity to the pixel values of a plurality of pixels of the particular region 3A.

Furthermore, the extractor 74 performs third extraction processing to extract, from the ten regions 3X (i.e., from the second image P2), a single or plurality of similar-in-balance regions 3D including a plurality of pixels, of which the pixel values have balance with a high degree of similarity to the balance in pixel values of a plurality of corresponding pixels of the particular region 3A.

In the second variation, the extractor 74 also performs all of the first, second, and third extraction processing. Alternatively, the extractor 74 may perform only one or two types of processing selected from the group consisting of the first, second, and third extraction processing.

In the example illustrated in FIG. 6, the extraction results of the first to third extraction processing perfectly agree with each other. That is to say, the extractor 74 extracts the same regions 3X (i.e., the nine other second segments 35X) with respect to all of the similar-in-shape regions 3B, the similar-in-pixel regions 3C, and the similar-in-balance regions 3D.

Optionally, the extraction result obtained by the extractor 74 may be displayed on the display device 58 via the display outputter 57 and presented to the user U1 as in the first variation described above.

The extraction results of the first to third extraction processing may indicate that there are no regions 3X with a high degree of similarity to the particular region 3A in the second image P2 and no similar-in-shape regions 3B, similar-in-pixel regions 3C, or similar-in-balance regions 3D may be extracted. In that case, a message indicating that there are no regions 3X with a high degree of similarity is preferably displayed on the display device 58 via the display outputter 57 to notify the user U1 to that effect. Then, the user U1 may abort the processing of creating the superposed image P4 and enter, into the inputter 54, a command of changing at least one of the first image P1 or the second image P2 into a different image.

The range generator 72 performs the range generation processing, thereby generating, based on the result of segmentation obtained by the segmenter 71 and the extraction result obtained by the extractor 74, a single or plurality of range patterns Q1 (e.g., four range patterns Q15-Q18 in the example illustrated in FIG. 6) for the second image P2. That is to say, although the range generator 72 generates the range pattern(s) Q1 based on the first image P1 in the exemplary embodiment and the first variation described above, the range generator 72 according to the second variation generates the range pattern(s) Q1 based on the second image P2, not the first image P1.

Each range pattern Q1 may be generated based on, for example, the respective pixel regions representing the first segment 34X, the nine second segment 35X, and the particular part E1 that have been extracted from the second image P2. The display outputter 57 has the plurality of range patterns Q1 displayed on the display device 58.

The creator 73 performs the creation processing to superpose the particular part E1 on the second image P2 in accordance with the range pattern Q1 thus determined, create a plurality of superposed images P4, and output the plurality of superposed images P4 as learning data.

The superposed image P4 thus created is an image (defective product image) in which the particular part E1 is displayed. This second variation also increases the chances of creating a superposed image P4 in which the particular part E1 is disposed at a spot where the particular part E1 may actually be present, thus further improving the accuracy of the learning data.

As described above, the segmenter 71 according to the second variation divides each of the first image P1 and the second image P2 into a plurality of regions (3, 3X). However, this is only an example and should not be construed as limiting. Alternatively, the segmenter 71 may divide only the second image P2 into a plurality of regions 3X. In that case, the data creation system 5 may acquire information specifying the plurality of regions 3 from an external device instead of making the segmenter 71 divide the first image P1. For example, the data creation system 5 may accept information specifying the plurality of regions 3 from the user U1 via the user interface 55. The range generator 72 may generate a single or plurality of range patterns Q1 in accordance with the information specified by the user U1, the result of segmentation obtained by the segmenter 71, and the extraction results obtained by the extractor 74.

Third Variation

Next, a data creation system 5 according to a third variation will be described with reference to FIG. 7. In the following description, any constituent element of this third variation, having substantially the same function as a counterpart of the embodiment described above, will be designated by the same reference numeral as that counterpart's, and description thereof will be omitted herein.

In each of the exemplary embodiment and first variation described above, a first image P1 in which a first object 1 including a particular part E1 (defective part) has been shot is acquired and subjected to the segmentation processing.

In this third variation, the first image acquirer 51 (refer to FIG. 1) functions as a part information acquirer for acquiring, as information about the particular part E1, only an image (part image P1A) representing the particular part E1. In this third variation, the particular part E1 is also supposed to be a defective part.

In addition, in this third variation, the second image acquirer 52 (refer to FIG. 1) functions as an image acquirer for acquiring an object image P2A representing the object 2A. Also, in this third variation, the data creation system 5 subjects the object image P2A to the segmentation processing. The third variation will now be described specifically.

The part image P1A may be, for example, a distance image. The part image P1A is a local image (partial image) corresponding to a pixel region representing almost only the particular part E1. The particular part E1 of the part image P1A represents a defective part which may be produced in a welded product. The part image P1A is substantially the same as an image corresponding to the pixel region representing the particular part E1 in the exemplary embodiment described above. Thus, a detailed description of the particular part E1 will be omitted herein.

The object image P2A may be, for example, a distance image. The object 2A shot in the object image P2A is an object with no particular parts E1 (defective parts). That is to say, the object 2A is a non-defective product. The object 2A is substantially the same welded product as the second object 2 according to the exemplary embodiment described above. Thus, a detailed description of the object 2A will be omitted herein.

The superposed image P4 may be, for example, a distance image. The object image P2A is an image that forms the basis of the superposed image P4. That is to say, the first base metal 21, second base metal 22, and bead 23 of the object 2A respectively correspond to the originals of the first base metal 41, second base metal 42, and bead 43 of the object 4 shot in the superposed image P4. Note that the superposed image P4 includes the particular part E1 (defective part) which is absent from the object image P2A.

The data creation system 5 according to this third variation includes the part information acquirer (first image acquirer 51), the image acquirer (second image acquirer 52), the segmenter 71, the range generator 72, and the creator 73. The other constituent elements of the data creation system 5 are substantially the same as their counterparts of the exemplary embodiment described above. The part information acquirer performs part information acquisition processing to acquire information about the particular part E1 (as the part image P1A). The image acquirer performs the image acquisition processing to acquire the object image P2A representing the object 2A.

Figure 7:
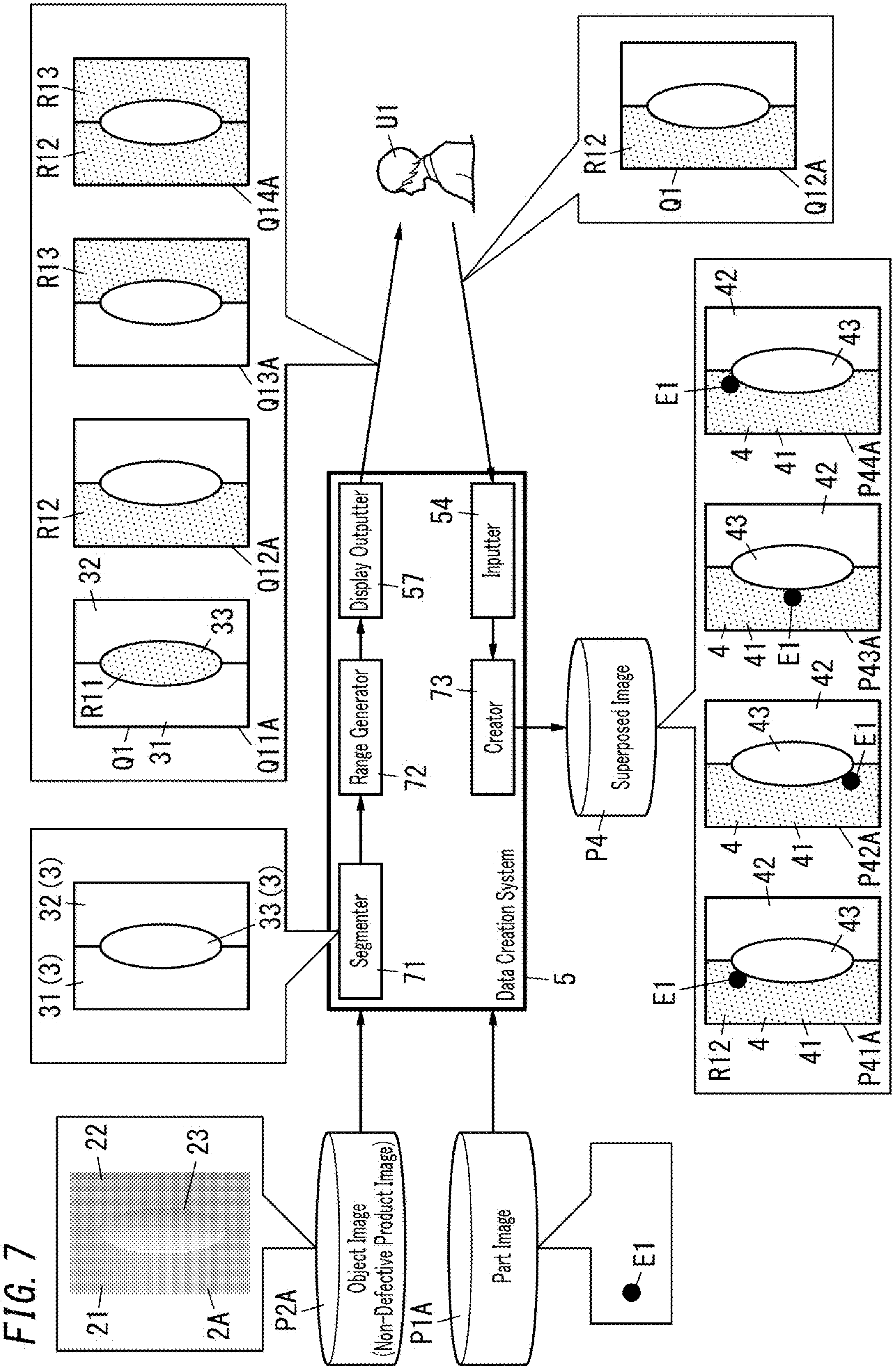
FIG. 7 is a conceptual diagram illustrating a plurality of images generated along the flow of a series of operations performed by a data creation system according to a third variation of the exemplary embodiment.

The segmenter 71 performs the segmentation processing to divide the object image P2A into a plurality of regions 3 (refer to FIG. 7). In this third variation, the segmenter 71 locates the respective pixel regions representing the first base metal 21, the second base metal 22, and the bead 23 and divides the object image P2A into three regions 3 along the boundaries between these pixel regions.

In the example illustrated in FIG. 7, a first segment 31, a second segment 32, and a third segment 33 are shown as the three regions 3. The first segment 31 is a pixel region representing the first base metal 21. The second segment 32 is a pixel region representing the second base metal 22. The third segment 33 is a pixel region representing the bead 23. Note that the object image P2A is a non-defective product image and has no particular parts E1. Thus, there is no need for the segmenter 71 to determine which of the plurality of regions 3 the particular part E1 is located in.

The range generator 72 performs the range generation processing to generate, in accordance with the result of segmentation obtained by the segmenter 71, a single or plurality of range patterns Q1 (e.g., four range patterns Q1, namely, range patterns Q11A, Q12A, Q13A, and Q14A in the example illustrated in FIG. 7) for the object image P2A. Although not shown in FIG. 7, each of the plurality of range patterns Q1 may include the particular part E1.

In the exemplary embodiment described above, the range setting information about the ranges R1-R6 of incidence is included in advance in the setting information 81. In this third variation, the range setting information about the range of incidence of the particular part E1 may or may not be included in the setting information 81, whichever is appropriate.

The range generator 72 may generate, if the setting information 81 includes any range setting information, the range pattern Q1 by reference to the range setting information. Alternatively, the range generator 72 may generate the four range patterns Q1 (Q11A, Q12A, Q13A, Q14A) based on only the three regions 3, for example.

The range pattern Q11A is a range pattern Q1 in which only the third segment 33 (i.e., a pixel region representing the bead 23) is defined to be a range R11 (indicated by the dotted hatching) where the particular part E1 may be present.

The range pattern Q12A is a range pattern Q1 in which only the first segment 31 (i.e., a pixel region representing the first base metal 21) is defined to be a range R12 (indicated by the dotted hatching) where the particular part E1 may be present.

The range pattern Q13A is a range pattern Q1 in which only the second segment 32 (i.e., a pixel region representing the second base metal 22) is defined to be a range R13 (indicated by the dotted hatching) where the particular part E1 may be present.

The range pattern Q14A is a range pattern Q1 in which only the first segment 31 and the second segment 32 are defined to be ranges R12, R13 (indicated by the dotted hatching) where the particular part E1 may be present.

If the data creation system 5 has recognized the type of the particular part E1 shot in the part image P1A, then the range generator 72 may generate the range pattern Q1 in accordance with the type of the particular part E1 and the three regions 3.

The display outputter 57 has the plurality of range patterns Q1 displayed on the display device 58. In addition, the display outputter 57 has the ranges R11-R13 of incidence where the particular part E1 may be present displayed in a highlighted form as shown in FIG. 7 to allow the user U1 to intuitively recognize the range of incidence. Although not shown in FIG. 7, the display outputter 57 may have a single or plurality of particular parts E1 presented in each range pattern Q1 displayed to allow the user U1 to intuitively recognize the particular part(s) E1.

The creator 73 performs the creation processing to create a single or plurality of superposed images P4 by superposing the particular part E1 on the object image P2A in accordance with at least one range pattern Q1 belonging to the single or plurality of range patterns Q1 and output the single or plurality of superposed images P4 as learning data. FIG. 7 illustrates an example in which the user U1 has chosen the range pattern Q12A from the four range patterns Q1. The creator 73 creates the four superposed images P4 (P41A, P42A, P43A, P44A) in accordance with the command that the range pattern Q12A be chosen accepted by the inputter 54. In these four superposed images P41A, P42A, P43A, P44A, the particular part E1 is present at mutually different locations. The creator 73 superposes the particular part E1 within a region corresponding to the range R12 in the object image P2A. When superposing the particular part E1, the creator 73 subjects the particular part E1 to image transformation processing. In the example illustrated in FIG. 7, in any of the four superposed images P4, the particular part E1 is placed, according to the type of the particular part E1 to be superposed, within the pixel region representing the first base metal 41 to be adjacent to the bead 43.

The superposed image P4 thus created is an image (defective product image) in which the particular part E1 is displayed. This third variation also increases the chances of creating a superposed image P4 in which the particular part E1 is disposed at a spot where the particular part E1 may actually be present, thus further improving the accuracy of the learning data.

The functions of the data creation system 5 according to this third variation may also be implemented as a data creation method. The data creation method according to the third variation includes part information acquisition processing, image acquisition processing, segmentation processing, range generation processing, and creation processing. The part information acquisition processing includes acquiring information about a particular part E1 (as a part image P1A). The image acquisition processing includes acquiring an object image P2A representing an object 2A. The segmentation processing includes dividing the object image P2A into a plurality of regions 3. The range generation processing includes generating, in accordance with the result of segmentation obtained in the segmentation processing, a single or plurality of range patterns Q1 for the object image P2A. The creation processing includes superposing, in accordance with at least one range pattern Q1 belonging to a single or plurality of range patterns Q1, the particular part E1 on the object image P2A to create a single or plurality of superposed images P4 and output the single or plurality of range patterns Q1 as learning data. A program according to this third variation is designed to cause one or more processors (of a computer system) to perform the data creation method according to the third variation. The program may be stored in a non-transitory storage medium which is readable for a computer system.

Fourth Variation

Next, a data creation system 5 according to a fourth variation will be described with reference to FIG. 8. In the following description, any constituent element of this fourth variation, having substantially the same function as a counterpart of the embodiment described above, will be designated by the same reference numeral as that counterpart's, and description thereof will be omitted herein.

This fourth variation is another version of the third variation described above. In this fourth variation, the first image acquirer 51 (refer to FIG. 1) also functions as a part information acquirer for acquiring, as information about the particular part E1, only an image (part image P1A) representing the particular part E1. In this fourth variation, the particular part E1 is also supposed to be a defective part.

In addition, in this fourth variation, the second image acquirer 52 (refer to FIG. 1) also functions as an image acquirer for acquiring an object image P2A representing the object 2A. Also, in this fourth variation, the data creation system 5 also subjects the object image P2A to the segmentation processing.

In this fourth variation, the object is supposed to be an article other than a welded product, e.g., a plate member having a surface on which a plurality of projections are arranged in matrix, for example, unlike the third variation. As an example, the object 2A according to the fourth variation is supposed to be substantially the same as the second object 2 according to the first variation. The fourth variation will now be described specifically.

The part image P1A may be, for example, a distance image. The part image P1A is a local image (partial image) corresponding to a pixel region representing almost only the particular part E1. The particular part E1 of the part image P1A is a defective part such as a scratch, a dent, or a depression. The part image P1A is substantially the same as, for example, an image corresponding to the pixel region representing the particular part E1 according to the first variation described above. Thus, a detailed description of the particular part E1 will be omitted herein.

The object image P2A may be, for example, a distance image. The object 2A shot in the object image P2A is an object with no particular parts E1 (defective parts). That is to say, the object 2A is a non-defective product. The object 2A is substantially the same as, for example, the second object 2 according to the first variation described above. Thus, a detailed description of the object 2A will be omitted herein.

The superposed image P4 may be, for example, a distance image. The object image P2A is an image that forms the basis of the superposed image P4. That is to say, a base material 24 and nine projections 25 of the object 2A respectively correspond to the originals of the base material 44 and nine projections 45 of the object 4 in the superposed image P4. Note that the superposed image P4 includes the particular part E1 (defective part) which is absent from the object image P2A.

The data creation system 5 according to this fourth variation includes the part information acquirer (first image acquirer 51), the image acquirer (second image acquirer 52), the segmenter 71, the range generator 72, and the creator 73. The other constituent elements of the data creation system 5 are substantially the same as their counterparts of the exemplary embodiment described above. The part information acquirer performs part information acquisition processing to acquire information about the particular part E1 (as the part image P1A). The image acquirer performs the image acquisition processing to acquire the object image P2A representing the object 2A.

Figure 8:
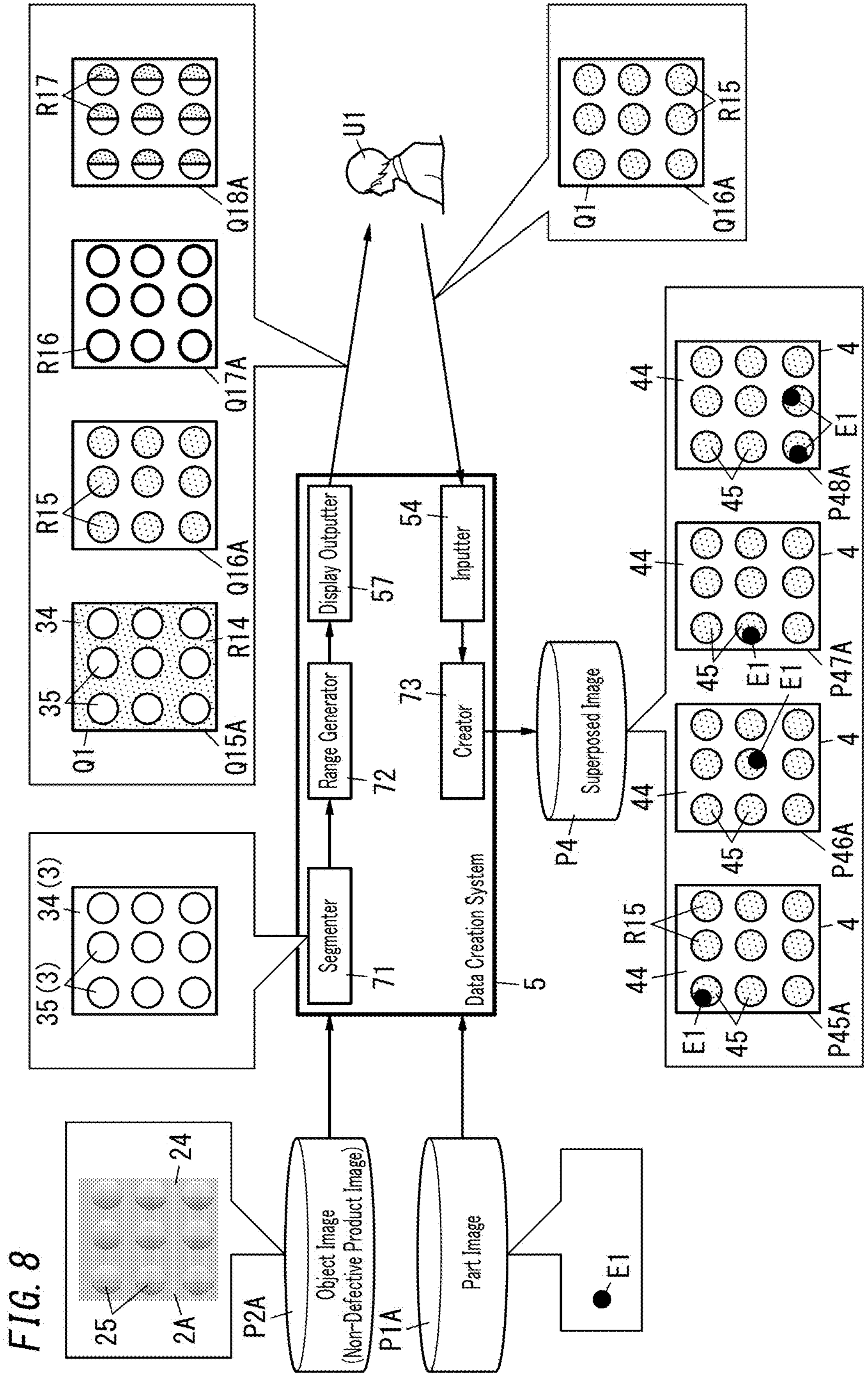
FIG. 8 is a conceptual diagram illustrating a plurality of images generated along the flow of a series of operations performed by a data creation system according to a fourth variation of the exemplary embodiment.

In the fourth variation, the segmenter 71 performs the segmentation processing to divide the object image P2A into a plurality of regions 3 (refer to FIG. 8). In this fourth variation, the segmenter 71 locates the respective pixel regions representing the base material 24 and the nine projections 25 and divides the object image P2A into ten regions 3 along the boundaries between these pixel regions.

In the example illustrated in FIG. 8, a first segment 34 and nine second segments 35 are shown as the ten regions 3. The first segment 34 is a pixel region representing the base material 24. Each of the second segments 35 is a pixel region representing a corresponding one of the projections 25. Note that the object image P2A is a non-defective product image and has no particular parts E1. Thus, there is no need for the segmenter 71 to determine which of the plurality of regions 3 the particular part E1 is located in.

The range generator 72 performs the range generation processing to generate, in accordance with the result of segmentation obtained by the segmenter 71, a single or plurality of range patterns Q1 (e.g., four range patterns Q1, namely, range patterns Q15A, Q16A, Q17A, and Q18A in the example illustrated in FIG. 8) for the object image P2A. Although not shown in FIG. 8, each of the plurality of range patterns Q1 may include the particular part E1.

In this fourth variation, the range setting information about the range of incidence of the particular part E1 may or may not be included in the setting information 81, whichever is appropriate.

The range generator 72 may generate, if the setting information 81 includes any range setting information, the range pattern Q1 by reference to the range setting information. Alternatively, the range generator 72 may generate the four range patterns Q1 (Q15A, Q16A, Q17A, Q18A) based on only the ten regions 3.

The range pattern Q15A is a range pattern Q1 in which only the first segment 34 (i.e., a pixel region representing the base material 24) is defined to be a range R14 (indicated by the dotted hatching) where the particular part E1 may be present.

The range pattern Q16A is a range pattern Q1 in which only the nine second segments 35 (i.e., pixel regions representing the nine projections 25) are defined in their entirety to be a range R15 (indicated by the dotted hatching) where the particular part E1 may be present.

The range pattern Q17A is a range pattern Q1 in which only peripheral edge portions of the nine second segments 35 (i.e., pixel regions representing the nine projections 25) are defined to be a range R16 where the particular part E1 may be present.

The range pattern Q18A is a range pattern Q1 in which only approximately respective right halves of the nine second segments 35 are defined to be a range R17 (indicated by the dotted hatching) where the particular part E1 may be present.

If the data creation system 5 has recognized the type of the particular part E1 shot in the part image P1A, then the range generator 72 may generate the range pattern Q1 in accordance with the type of the particular part E1 and the ten regions 3.

The display outputter 57 has the plurality of range patterns Q1 displayed on the display device 58. In addition, the display outputter 57 has the ranges R14-R17 of incidence where the particular part E1 may be present displayed in a highlighted form as shown in FIG. 8 to allow the user U1 to intuitively recognize the range of incidence. Although not shown in FIG. 8, the display outputter 57 may have a single or plurality of particular parts E1 presented in each range pattern Q1 displayed to allow the user U1 to intuitively recognize the particular part(s) E1.

The creator 73 performs the creation processing to create a single or plurality of superposed images P4 by superposing the particular part E1 on the object image P2A in accordance with at least one range pattern Q1 belonging to the single or plurality of range patterns Q1 and output the single or plurality of superposed images P4 as learning data. FIG. 8 illustrates an example in which the user U1 has chosen the range pattern Q16A from the four range patterns Q1. The creator 73 creates the four superposed images P4 (P45A, P46A, P47A, P48A) in accordance with the command that the range pattern Q16A be chosen accepted by the inputter 54. In these four superposed images P45A, P46A, P47A, P48A, the particular part E1 is present at mutually different locations. In particular, two particular parts E1 are superposed on the superposed image P48A. The creator 73 superposes the particular part E1 within a region corresponding to the range R15 in the object image P2A. When superposing the particular part E1, the creator 73 subjects the particular part E1 to image transformation processing. In the example illustrated in FIG. 8, in any of the four superposed images P4, the particular part E1 is placed, according to the type of the particular part E1 to be superposed, within the pixel region representing a corresponding one of the projections 45 to be adjacent to the base material 44.

The superposed image P4 thus created is an image (defective product image) in which the particular part E1 is displayed. This fourth variation also increases the chances of creating a superposed image P4 in which the particular part E1 is disposed at a spot where the particular part E1 may actually be present, thus further improving the accuracy of the learning data.

Other Variations of Exemplary Embodiment

Next, other variations of the exemplary embodiment will be enumerated one after another. Note that the variations to be described below may be adopted in combination as appropriate. Alternatively, the variations to be described below may also be adopted in combination with the exemplary embodiment and the first to fourth variations described above.

The learned model 82 does not have to be a model for use in the weld appearance test but may also be a model for use in any of various other types of inspection. In addition, the learned model 82 does not have to be a model used for inspection purposes but may also be a model for use in various types of image recognition.

The agent that performs at least one of the segmentation processing, the range generation processing, or the creation processing does not have to be the image processor 53 but may also be provided outside of the image processor 53.

At least one of the user interface 55, the display device 58, the learner 60, or the decider 61 may be provided outside of the data creation system 5. The display device 58 may be a mobile communications device such as a smartphone or a tablet computer.

The images processed by the data creation system 5 (including the first image P1, the second image P2, the superposed image P4, and the inspection image P5) do not have to be three-dimensional images but may also be two-dimensional images or even four- or more-dimensional images.

The superposed image P4 does not have to be a defective product image but may also be a non-defective product image.

The first object 1 shot in the first image P1 may be an article having either the same shape as, or a different shape from, the second object 2 shot in the second image P2.

The first image P1 and the second image P2 may be the same image. That is to say, a superposed image P4 with two particular parts E1 may be created by superposing the particular part E1 in the first image P1 at a different location from the particular part E1 in the second image P2. In other words, the first image P1 and the second image P2 may be defective product images.

Furthermore, the particular part E1 does not have to be a defective part. Stated otherwise, the first image P1 and the second image P2 may be non-defective product images. Alternatively, one of the first and second images P1, P2 may be a non-defective product image and the other may be a defective product image.

The first image P1 may be an image generated by shooting a part or all of the first object 1. The second image P2 may be an image generated by shooting a part or all of the second object 2.

The first image P1, the second image P2, the superposed image P4, and the inspection image P5 may be luminance image data representing the luminance of an object by grayscales. In the exemplary embodiment described above, the "grayscales" represent densities of a single color (e.g., the color black). Alternatively, the "grayscales" may also represent respective densities of multiple different colors (such as the three colors of RGB).

In the third and fourth variations described above, the data creation system 5 includes the part information acquirer for acquiring, as a piece of information about the particular part E1, the part image P1A that is a local image (partial image) corresponding to a pixel region representing almost only the particular part E1. However, the data creation system 5 only needs to acquire a piece of information for use to locate the particular part E1 and does not have to acquire an image representing the particular part E1. Alternatively, the part information acquirer may also acquire, as a piece of information about the particular part E1, either numerical value data such as the distance of the particular part E1 or time series data such as one-dimensional waveform data about the particular part E1. The data creation system 5 may produce, by itself, an image representing the particular part E1 based on such data and create a superposed image P4 including the particular part E1.

The functions of the data creation system 5 according to the exemplary embodiment described above may also be implemented as, for example, a data creation method, a computer program, or a non-transitory storage medium that stores the computer program thereon.

The data creation system 5 according to the present disclosure includes a computer system. The computer system may include a processor and a memory as principal hardware components thereof. The computer system performs functions of the data creation system 5 according to the present disclosure by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits such as an IC or an LSI include integrated circuits called a "system LSI," a "very-large-scale integrated circuit (VLSI)," and an "ultra-large-scale integrated circuit (ULSI)." Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or plurality of electronic circuits including a semiconductor integrated circuit or a large-scale integrated circuit.

In the embodiment described above, the plurality of functions of the data creation system 5 are integrated together in a single housing. However, this is not an essential configuration for the data creation system 5 and should not be construed as limiting. Alternatively, those constituent elements of the data creation system 5 may be distributed in multiple different housings. Conversely, the plurality of functions of the data creation system 5 may be aggregated together in a single housing. Still alternatively, at least some functions of the data creation system 5 (e.g., some functions of the data creation system 5) may be implemented as a cloud computing system as well.

(Recapitulation)

The exemplary embodiment and its variations described above are specific implementations of the following aspects of the present disclosure.

A data creation system (5) according to a first aspect is configured to create learning data for generating a learned model (82) for use to recognize a particular part (E1). The data creation system (5) includes a first image acquirer (51), a second image acquirer (52), a segmenter (71), a range generator (72), and a creator (73). The first image acquirer (51) acquires a first image (P1) representing a first object (1) including the particular part (E1). The second image acquirer (52) acquires a second image (P2) representing a second object (2). The segmenter (71) divides at least one of the first image (P1) or the second image (P2) into a plurality of regions (3, 3X). The range generator (72) generates, based on a result of segmentation obtained by the segmenter (71), a single or plurality of range patterns (Q1). The creator (73) superposes, in accordance with at least one range pattern (Q1) belonging to the single or plurality of range patterns (Q1), the particular part (E1) on the second image (P2) to create a single or plurality of superposed images (P4) and output the single or plurality of superposed images (P4) as the learning data.

According to this aspect, a particular part (E1) is superposed on the second image (P2) in accordance with a range pattern (Q1), thus contributing to improving the accuracy of learning data.

In a data creation system (5) according to a second aspect, which may be implemented in conjunction with the first aspect, the particular part (E1) is a defective part. The first object (1) is an object with the defective part. The second object (2) is an object without the defective part.

This aspect improves the accuracy of learning data for generating a learned model (82) to recognize a defective part.

In a data creation system (5) according to a third aspect, which may be implemented in conjunction with the first or second aspect, the plurality of regions (3) includes a particular region (3A) where the particular part (E1) is located. The data creation system (5) further includes an extractor (74). The extractor (74) extracts, from either the first image (P1) or the second image (P2), a single or plurality of similar-in-shape regions (3B), each having a shape which is highly similar to a shape of the particular region (3A). The range generator (72) generates, as one range pattern (Q1) belonging to the single or plurality of range patterns (Q1), a range pattern (Q1) including the particular region (3A) and the single or plurality of similar-in-shape regions (3B).

This aspect increases the chances of creating a superposed image (P4) in which the particular part (E1) is disposed at a spot where the particular part (E1) may actually be produced, thus further improving the accuracy of the learning data.

In a data creation system (5) according to a fourth aspect, which may be implemented in conjunction with any one of the first to third aspects, the plurality of regions (3) includes a particular region (3A) where the particular part (E1) is located. The data creation system (5) further includes an extractor (74). The extractor (74) extracts, from either the first image (P1) or the second image (P2), a single or plurality of similar-in-pixel regions (3C), each including a plurality of pixels with pixel values which are highly similar to pixel values of a plurality of corresponding pixels of the particular region (3A). The range generator (72) generates, as one range pattern (Q1) belonging to the single or plurality of range patterns (Q1), a range pattern (Q1) including the particular region (3A) and the single or plurality of similar-in-pixel regions (3C).

This aspect increases the chances of creating a superposed image (P4) in which the particular part (E1) is disposed at a spot where the particular part (E1) may actually be produced, thus further improving the accuracy of the learning data.

In a data creation system (5) according to a fifth aspect, which may be implemented in conjunction with any one of the first to fourth aspects, the plurality of regions (3) includes a particular region (3A) where the particular part (E1) is located. The data creation system (5) further includes an extractor (74). The extractor (74) extracts, from either the first image (P1) or the second image (P2), a single or plurality of similar-in-balance regions (3D), each including a plurality of pixels having a pixel value balance which is highly similar to a pixel value balance over a plurality of corresponding pixels of the particular region (3A). The range generator (72) generates, as one range pattern (Q1) belonging to the single or plurality of range patterns (Q1), a range pattern (Q1) including the particular region (3A) and the single or plurality of similar-in-balance regions (3D).

This aspect increases the chances of creating a superposed image (P4) in which the particular part (E1) is disposed at a spot where the particular part (E1) may actually be produced, thus further improving the accuracy of the learning data.

In a data creation system (5) according to a sixth aspect, which may be implemented in conjunction with any one of the first to fifth aspects, the plurality of regions (3) includes a particular region (3A) where the particular part (E1) is located. The range generator (72) generates, as the at least one range pattern (Q1) belonging to the single or plurality of range patterns (Q1), at least one range pattern (Q1) selected from the group consisting of a range pattern (Q1), of which a range is defined by only a peripheral edge portion (303) of the particular region (3A), and a range pattern (Q1), of which a range is defined by all of the particular region (3A).

This aspect increases the chances of creating a superposed image (P4) in which the particular part (E1) is disposed at a spot where the particular part (E1) may actually be produced, thus further improving the accuracy of the learning data.

In a data creation system (5) according to a seventh aspect, which may be implemented in conjunction with any one of the first to sixth aspects, the plurality of regions (3) includes a particular region (3A) where the particular part (E1) is located. If the particular region (3A) has an elongate shape, the range generator (72) generates, as the at least one range pattern (Q1) belonging to the single or plurality of range patterns (Q1), at least one range pattern (Q1) selected from the group consisting of a range pattern (Q1), of which a range is defined by only one end portion (a first end portion 301 or a second end portion 302) along a longitudinal axis of the particular region (3A), and a range pattern (Q1), of which a range is defined by only both end portions (the first end portion 301 and the second end portion 302) along the longitudinal axis of the particular region (3A).

This aspect increases the chances of creating a superposed image (P4) in which the particular part (E1) is disposed at a spot where the particular part (E1) may actually be produced, thus further improving the accuracy of the learning data.

A data creation system (5) according to an eighth aspect is configured to create learning data for generating a learned model (82) for use to recognize a particular part (E1). The data creation system (5) includes a part information acquirer (first image acquirer 51), an image acquirer (second image acquirer 52), a segmenter (71), a range generator (72), and a creator (73). The part information acquirer acquires information about the particular part (E1). The image acquirer acquires an object image (P2A) representing an object (2A). The segmenter (71) divides the object image (P2A) into a plurality of regions (3). The range generator (72) generates, based on a result of segmentation obtained by the segmenter (71), a single or plurality of range patterns (Q1) for the object image (P2A). The creator (73) superposes, in accordance with at least one range pattern (Q1) belonging to the single or plurality of range patterns (Q1), the particular part (E1) on the object image (P2A) to create a single or plurality of superposed images (P4) and output the single or plurality of superposed images (P4) as the learning data.

According to this aspect, a particular part (E1) is superposed on the object image (P2A) in accordance with a range pattern (Q1), thus contributing to improving the accuracy of learning data.

In a data creation system (5) according to a ninth aspect, which may be implemented in conjunction with the eighth aspect, the particular part (E1) is a defective part, and the object (2A) is an object without the defective part.

This aspect improves the accuracy of learning data for generating a learned model (82) to recognize a defective part.

A data creation system (5) according to a tenth aspect, which may be implemented in conjunction with any one of the first to ninth aspects, further includes a display outputter (57) and an inputter (54). The display outputter (57) make a display device (58) display the single or plurality of range patterns (Q1). The inputter (54) accepts a command entry for choosing the at least one range pattern (Q1) from the single or plurality of range patterns (Q1) displayed. The creator (73) creates the single or plurality of superposed images (P4) in accordance with the command entry accepted by the inputter (54).

This aspect allows at least one appropriate range pattern (Q1) to be chosen, via a user's (U1) visual check, from the single or plurality of range patterns (Q1). This increases the chances of creating a superposed image (P4) disposed at a spot where the particular part (E1) may actually be produced, compared to a situation where the data creation system (5) performs every processing automatically not via the user's (U1) visual check.

In a data creation system (5) according to an eleventh aspect, which may be implemented in conjunction with the tenth aspect, the display outputter (57) makes the display device (58) display, as one range pattern (Q1) belonging to the single or plurality of range patterns (Q1), a range pattern (Q1) in which a plurality of the particular parts (E1, E2) are superposed at a predetermined density.

This aspect makes it easier for the user (U1) to intuitively sense a spots where the particular parts (E1, E2) may actually be produced and determine which range pattern (Q1) is more appropriately chosen from the single or plurality of range patterns (Q1).

A data creation method according to a twelfth aspect is designed to create learning data for generating a learned model (82) for use to recognize a particular part (E1). The data creation method includes first image acquisition processing, second image acquisition processing, segmentation processing, range generation processing, and creation processing. The first image acquisition processing includes acquiring a first image (P1) representing a first object (1) including the particular part (E1). The second image acquisition processing includes acquiring a second image (P2) representing a second object (2). The segmentation processing includes dividing at least one of the first image (P1) or the second image (P2) into a plurality of regions (3, 3X). The range generation processing includes generating, based on a result of segmentation obtained in the segmentation processing, a single or plurality of range patterns (Q1). The creation processing includes superposing, in accordance with at least one range pattern (Q1) belonging to the single or plurality of range patterns (Q1), the particular part (E1) on the second image (P2) to create a single or plurality of superposed images (P4) and output the single or plurality of superposed images (P4) as the learning data.

According to this aspect, a particular part (E1) is superposed on the second image (P2) in accordance with a range pattern (Q1), thus providing a data creation method contributing to improving the accuracy of learning data.

A data creation method according to a thirteenth aspect is designed to create learning data for generating a learned model (82) for use to recognize a particular part (E1). The data creation method includes part information acquisition processing, image acquisition processing, segmentation processing, range generation processing, and creation processing. The part information acquisition processing includes acquiring information about the particular part (E1). The image acquisition processing includes acquiring an object image (P2A) representing an object (2A). The segmentation processing includes dividing the object image (P2A) into a plurality of regions (3). The range generation processing includes generating, based on a result of segmentation obtained in the segmentation processing, a single or plurality of range patterns (Q1) for the object image (P2A). The creation processing includes superposing, in accordance with at least one range pattern (Q1) belonging to the single or plurality of range patterns (Q1), the particular part (E1) on the object image (P2A) to create a single or plurality of superposed images (P4) and output the single or plurality of superposed images (P4) as the learning data.

According to this aspect, a particular part (E1) is superposed on the object image (P2A) in accordance with a range pattern (Q1), thus providing a data creation method contributing to improving the accuracy of learning data.

A program according to a fourteenth aspect is designed to cause one or more processors to perform the data creation method according to the twelfth or thirteenth aspect.

This aspect provides a function that may contribute to improving the accuracy of learning data.

Note that the constituent elements according to the second to seventh aspects and the tenth and eleventh aspects are not essential constituent elements for the data creation system (5) according to the first aspect but may be omitted as appropriate. Also, note that the constituent elements according to the ninth to eleventh aspects are not essential constituent elements for the data creation system (5) according to the eighth aspect but may be omitted as appropriate.

REFERENCE SIGNS LIST

1 First Object
2 Second Object
2A Object
3, 3X Region
3A Particular Region
301 First End Portion (End Portion)
302 Second End Portion (End Portion)
303 Peripheral Edge Portion
3B Similar-in-Shape Region
3C Similar-in-Pixel Region
3D Similar-in-Balance Region
5 Data Creation System
51 First Image Acquirer (Part Information Acquirer)
52 Second Image Acquirer (Image Acquirer)
54 Inputter
57 Display Outputter
58 Display Device
71 Segmenter
72 Range Generator
73 Creator
74 Extractor
82 Learned Model
E1 Particular Part
P1 First Image
P2 Second Image
P2A Object Image
P4 Superposed Image
Q1 Range Pattern

The invention claimed is:

1. A data creation system configured to create learning data for generating a learned model for use to recognize a particular part, the data creation system comprising:
a first image acquirer configured to acquire a first image representing a first object including the particular part;
a second image acquirer configured to acquire a second image representing a second object;
a segmenter configured to divide at least one of the first image or the second image into a plurality of regions;
a range generator configured to generate, based on a result of segmentation obtained by the segmenter, a single or plurality of range patterns; and
a creator configured to superpose, in accordance with at least one range pattern belonging to the single or plurality of range patterns, the particular part on the second image to create a single or plurality of superposed images and output the single or plurality of superposed images as the learning data.

2. The data creation system of claim 1, wherein
the particular part is a defective part,
the first object is an object with the defective part, and
the second object is an object without the defective part.

3. The data creation system of claim 1, wherein
the plurality of regions includes a particular region where the particular part is located,
the data creation system further includes an extractor configured to extract, from either the first image or the second image, a single or plurality of similar-in-shape regions, each having a shape which is highly similar to a shape of the particular region, and
the range generator is configured to generate, as one range pattern belonging to the single or plurality of range patterns, a range pattern including the particular region and the single or plurality of similar-in-shape regions.

4. The data creation system of claim 1, wherein
the plurality of regions includes a particular region where the particular part is located,
the data creation system further includes an extractor configured to extract, from either the first image or the second image, a single or plurality of similar-in-pixel regions, each including a plurality of pixels with pixel values which are highly similar to pixel values of a plurality of corresponding pixels of the particular region, and
the range generator is configured to generate, as one range pattern belonging to the single or plurality of range patterns, a range pattern including the particular region and the single or plurality of similar-in-pixel regions.

5. The data creation system of claim 1, wherein
the plurality of regions includes a particular region where the particular part is located,
the data creation system further includes an extractor configured to extract, from either the first image or the second image, a single or plurality of similar-in-balance regions, each including a plurality of pixels having a pixel value balance which is highly similar to a pixel value balance over a plurality of corresponding pixels of the particular region, and
the range generator is configured to generate, as one range pattern belonging to the single or plurality of range patterns, a range pattern including the particular region and the single or plurality of similar-in-balance regions.

6. The data creation system of claim 1, wherein
the plurality of regions includes a particular region where the particular part is located, and
the range generator is configured to generate, as the at least one range pattern belonging to the single or plurality of range patterns, at least one range pattern selected from the group consisting of a range pattern, of which a range is defined by only a peripheral edge portion of the particular region, and a range pattern, of which a range is defined by all of the particular region.

7. The data creation system of claim 1, wherein
the plurality of regions includes a particular region where the particular part is located, and
the range generator is configured to, when the particular region has an elongate shape, generate, as the at least one range pattern belonging to the single or plurality of range patterns, at least one range pattern selected from the group consisting of a range pattern, of which a range is defined by only one end portion along a longitudinal axis of the particular region, and a range pattern, of which a range is defined by only both end portions along the longitudinal axis of the particular region.

8. The data creation system of claim 1, further comprising:
a display outputter configured to make a display device display the single or plurality of range patterns; and
an inputter configured to accept a command entry for choosing at least one range pattern belonging to the single or plurality of range patterns displayed, wherein
the creator is configured to create the single or plurality of superposed images in accordance with the command entry accepted by the inputter.

9. The data creation system of claim 8, wherein the display outputter is configured to make the display device display, as one range pattern belonging to the single or plurality of range patterns, a range pattern in which a plurality of the particular parts are superposed at a predetermined density.

10. A data creation system configured to create learning data for generating a learned model for use to recognize a particular part, the data creation system comprising:

a part information acquirer configured to acquire information about the particular part;

an image acquirer configured to acquire an object image representing an object;

a segmenter configured to divide the object image into a plurality of regions;

a range generator configured to generate, based on a result of segmentation obtained by the segmenter, a single or plurality of range patterns for the object image; and a creator configured to superpose, in accordance with at least one range pattern belonging to the single or plurality of range patterns, the particular part on the object image to create a single or plurality of superposed images and output the single or plurality of superposed images as the learning data.

11. The data creation system of claim 10, wherein the particular part is a defective part, and the object is an object without the defective part.

12. The data creation system of claim 10, further comprising:

a display outputter configured to make a display device display the single or plurality of range patterns; and an inputter configured to accept a command entry for choosing at least one range pattern belonging to the single or plurality of range patterns displayed, wherein the creator is configured to create the single or plurality of superposed images in accordance with the command entry accepted by the inputter.

13. The data creation system of claim 12, wherein the display outputter is configured to make the display device display, as one range pattern belonging to the single or plurality of range patterns, a range pattern in which a plurality of the particular parts are superposed at a predetermined density.

14. A data creation method designed to create learning data for generating a learned model for use to recognize a particular part, the data creation method comprising:

part information acquisition processing including acquiring information about the particular part;

image acquisition processing including acquiring an object image representing an object;

segmentation processing including dividing the object image into a plurality of regions;

range generation processing including generating, based on a result of segmentation obtained in the segmentation processing, a single or plurality of range patterns for the object image; and creation processing including superposing, in accordance with at least one range pattern belonging to the single or plurality of range patterns, the particular part on the object image to create a single or plurality of superposed images and output the single or plurality of superposed images as the learning data.

15. A non-transitory computer-readable tangible recording medium storing a program designed to cause one or more processors to perform the data creation method of claim 14.

16. A data creation method designed to create learning data for generating a learned model for use to recognize a particular part, the data creation method comprising:

first image acquisition processing including acquiring a first image representing a first object including the particular part;

second image acquisition processing including acquiring a second image representing a second object;

segmentation processing including dividing at least one of the first image or the second image into a plurality of regions;

range generation processing including generating, based on a result of segmentation obtained in the segmentation processing, a single or plurality of range patterns; and creation processing including superposing, in accordance with at least one range pattern belonging to the single or plurality of range patterns, the particular part on the second image to create a single or plurality of superposed images and output the single or plurality of superposed images as the learning data.

17. A non-transitory computer-readable tangible recording medium storing a program designed to cause one or more processors to perform the data creation method of claim 16.

* * * * *